US008505478B2

(12) United States Patent
Suekane et al.

(10) Patent No.: US 8,505,478 B2
(45) Date of Patent: Aug. 13, 2013

(54) APPARATUS FOR HIGH-EFFICIENCY SYNTHESIS OF CARBON NANOSTRUCTURE

(75) Inventors: Osamu Suekane, Sakai (JP); Toshikazu Nosaka, Izumi (JP); Yoshikazu Nakayama, Hirakata (JP); Lujun Pan, Sakai (JP); Takeshi Nagasaka, Tokyo (JP); Toru Sakai, Tokyo (JP); Hiroyuki Tsuchiya, Kyoto (JP); Toshiki Goto, Osaka (JP); Xu Li, Osaka (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 184 days.

(21) Appl. No.: 12/805,528

(22) Filed: Aug. 4, 2010

(65) Prior Publication Data

US 2010/0303675 A1    Dec. 2, 2010

Related U.S. Application Data

(62) Division of application No. 10/551,051, filed as application No. PCT/JP2004/003988 on Mar. 23, 2004, now Pat. No. 7,790,228.

(30) Foreign Application Priority Data

Mar. 24, 2003   (JP) .................................. 2003-81651

(51) Int. Cl.

| C23C 16/52 | (2006.01) |
| C23C 16/455 | (2006.01) |
| C23F 1/00 | (2006.01) |
| H01L 21/306 | (2006.01) |
| C23C 16/06 | (2006.01) |
| C23C 16/22 | (2006.01) |

(52) U.S. Cl.
USPC ........... 118/696; 118/695; 118/698; 118/715; 156/345.24; 156/345.26

(58) Field of Classification Search
USPC ............ 118/696, 695, 698, 715; 156/345.24, 156/345.26
See application file for complete search history.

(56) References Cited

U.S. PATENT DOCUMENTS 4,917,136 A * 4/1990 Ohmi et al. ................ 137/15.04
4,975,252 A * 12/1990 Nishizawa et al. ........... 118/688
(Continued)

FOREIGN PATENT DOCUMENTS

CN    1315588    10/2001
JP    61187230 A * 8/1986
(Continued)

OTHER PUBLICATIONS

Japaneses Office Action dated Sep. 14, 2010 in correspoding Japanese Application No. 2005-504069, with English translation.

(Continued)

Primary Examiner — Rudy Zervigon
(74) Attorney, Agent, or Firm — Harness, Dickey & Pierce

(57) ABSTRACT

Developed is high-efficiency synthesis method and apparatus capable of promoting the initial growth of carbon nanostructure by eliminating the initial fluctuation time and rising time in raw gas flow quantity.-A high-efficiency synthesis method of carbon nanostructure according to the present invention is a high-efficiency synthesis method of carbon nanostructure, the method comprising: bringing raw material gas and a catalyst into contact with each other under reactive conditions so as to produce a carbon nanostructure, wherein: the initiation of contact of the raw material gas with the catalyst is carried out instantaneously. Reaction conditions such as temperature and raw material gas concentration are set so as to meet those for catalyst growth, and under the reaction conditions, the initiation of contact of raw material gas G with catalyst 6 is carried out instantaneously. Consequently, the initial growth of carbon nanostructure is positively carried out, and the height growth and thickness growth thereof can be effected in high efficiency. Further, high-density growth and short-time high-speed growth can be realized. The catalyst includes any forms of catalyst such as catalyst substrate, catalyst structure, catalyst powders and catalyst pellet. It is especially preferred to employ a system wherein the feed and interruption of the raw material gas G are intermittently controlled by means of an electromagnetic three-way valve 24.

12 Claims, 21 Drawing Sheets

(56) References Cited

U.S. PATENT DOCUMENTS

| | | | |
|---|---|---|---|
| 5,254,210 A * | 10/1993 | Jones et al. | 117/91 |
| 5,261,961 A | 11/1993 | Takasu et al. | |
| 5,401,316 A * | 3/1995 | Shiraishi et al. | 118/689 |
| 5,769,950 A * | 6/1998 | Takasu et al. | 118/715 |
| 5,804,507 A * | 9/1998 | Perlov et al. | 438/692 |
| 6,077,718 A | 6/2000 | Takasu et al. | |
| 6,350,488 B1 | 2/2002 | Lee et al. | |
| 6,365,229 B1 * | 4/2002 | Robbins | 427/248.1 |
| 6,464,793 B1 * | 10/2002 | Nishizawa et al. | 118/725 |
| 7,011,710 B2 * | 3/2006 | Bang et al. | 118/715 |
| 7,067,846 B2 * | 6/2006 | Takahashi et al. | 257/79 |
| 7,790,228 B2 * | 9/2010 | Suekane et al. | 427/248.1 |
| 2001/0009693 A1 | 7/2001 | Lee et al. | |
| 2002/0000195 A1 * | 1/2002 | Bang et al. | 118/715 |
| 2003/0010279 A1 | 1/2003 | Nakayama et al. | |
| 2003/0070617 A1 * | 4/2003 | Kim et al. | 118/715 |
| 2005/0115504 A1 * | 6/2005 | Ueda et al. | 118/723 R |
| 2005/0126483 A1 * | 6/2005 | Tognetti | 118/715 |
| 2005/0221004 A1 * | 10/2005 | Kilpela et al. | 427/248.1 |

FOREIGN PATENT DOCUMENTS

| | | | |
|---|---|---|---|
| JP | 62105997 A * | 5/1987 | |
| JP | 62-022420 | 7/1987 | |
| JP | 62-158870 | 7/1987 | |
| JP | 63107111 A * | 5/1988 | |
| JP | 11-130590 | 5/1999 | |
| JP | 2001-011630 | 1/2001 | |
| JP | 2001-220674 A | 8/2001 | |
| JP | 2001-234341 A | 8/2001 | |
| JP | 2001-240403 A | 9/2001 | |
| JP | 2003-026410 | 1/2003 | |
| JP | 2003-277031 | 10/2003 | |
| WO | WO 00/26138 A1 | 5/2000 | |

OTHER PUBLICATIONS

Z. F. Ren et al., Synthesis of large arrays of well-aligned carbon nanotubes on glass, Science, 1998, vol. 282, p. 1105-1107.

Anyuan Cao et al., An effective way to lower catalyst content in well-aligned carbon nanotube films, Carbon, 2001, vol. 39, p. 152-155.

Osamu Suekane et al., Initial growth stage of aligned carbon nanotubes. Jul. 23, 1993, p. 63.

International Search Report, Jun. 22, 2004.

Chinese Office Action for corresponding Chinese Application No. 2004-80007972.8 (w/ English translation).

European Search Report dated Jul. 24, 2009 issued in corresponding Application No. EP 04722656.

Vander Wal et al, " Ferrocene as a Precursor Reagent for Metal-Catalyzed Carbon Nanotubes: Competing Effects," Combustion and Flame, vol. 130, pp. 27-36, Elsevier Science Publishing Co., New York, N.Y., U.S. (2002).

Qin et al., "Helical carbon nanofibers prepared by pyrolysis of acetylene with a catalyst derived from the decomposition of copper tartrate," vol. 41, pp. 3072-3074, Elsevier Ltd. (2003).

* cited by examiner (2A)

(2B)

(5A)

(5B)

(6A)

very thin film (6B)

<H> = 2.5 μm

<H>=1.0μm

APPARATUS FOR HIGH-EFFICIENCY SYNTHESIS OF CARBON NANOSTRUCTURE

PRIORITY STATEMENT

This application is a divisional application of U.S. application Ser. No. 10/551,051, filed on Jul. 3, 2006, now U.S. Pat. No. 7,790,228 which is a national phase of International Application No. PCT/JP2004/003988, filed on Mar. 23, 2004, which claims priority to Japanese Patent Application No. 2003-81651, filed on Mar. 24, 2003, in the Japan Intellectual Property Office, the entire contents of each of which are incorporated herein by reference in their entirety.

TECHNICAL FIELD

The present invention relates to a method of producing carbon nanostructures such as carbon nanotubes and carbon nanocoils. More specifically, the present invention relates to (a) method and apparatus for high-efficiency synthesis of carbon nanostructure, in which improvement of contact conditions in the reaction between the raw material gas and the catalyst increases an initial growth rate of carbon nanostructure and thus realizes high efficiency production of carbon nanostructures; and (b) carbon nanostructure.

BACKGROUND ART

A carbon nanostructure of the present invention is a nano-sized substance composed of carbon atoms. Examples of the carbon nanostructure include carbon nanotubes, carbon nanotubes with beads, brush-type carbon nanotubes that are a forest of carbon nanotubes, carbon nanotwists that are carbon nanotubes having twists, carbon nanocoils in coil form, and fullerenes in spherical shell form. In the following description, these many carbon substances are collectively referred to as carbon nanostructures.

As a method for producing these carbon nanostructures, known are: chemical vapor deposition (CVD) method of decomposing raw material gas, such as hydrocarbon, so as to form a target substance; and catalyst chemical vapor deposition (CCVD) method of forming a target substance by catalysis. The CCVD method is merely one form of the CVD method.

The present invention relates to a method for producing carbon nanostructure by the foregoing CVD method. The CVD method collectively means a method of decomposing raw material gas in a reaction container so as to cause a catalyst to form a target substance. Decomposing means includes various kinds of decomposing means such as heat, electron beam, laser beam, and ion beam.

Conventionally, in order to produce carbon nanostructure by the CVD method, adopted is a method of introducing a mixed gas of raw material gas and carrier gas into a reaction chamber and decomposing raw material gas by catalysis so as to form carbon nanostructure on a catalyst.

FIG. 18 is a schematic block diagram of a carbon nanostructure synthesis apparatus 50 that is a first conventional art. The conventional carbon nanostructure synthesis apparatus 50 is arranged such that a catalyst support 6 is placed in a reaction chamber 4, and carrier gas and raw material gas are fed in the reaction chamber 4 so that carbon nanostructure 8 grows on the surface of the catalyst support 6.

Carrier gas, such as He, delivered from a carrier gas container 10 is decompressed by a regulator 12, controlled to be of a predetermined flow quantity by a carrier gas flow quantity controller 14 such as a mass flow controller, and then fed at a necessary timing from a carrier gas valve 16.

Meanwhile, raw material gas, such as $C_2H_2$, delivered from a raw material gas container 18 is decompressed by a regulator 20, controlled to be of a predetermined flow quantity by a raw material gas flow quantity controller 22 such as a mass flow controller, and then fed at a necessary timing from a raw material gas valve 16.

Carrier gas and raw material gas are mixed in a merge section 32, and jetted through a gas feed nozzle 34 into the reaction chamber 4 in a direction indicated by an arrow c. Raw material gas is decomposed by a catalyst support 6. On the surface of the catalyst support 6, the carbon nanostructure 8 is synthesized, and unwanted gas is exhausted from a delivery pipe 36 in a direction indicated by an arrow d.

FIG. 19 is a time series graph showing initial instability of flow quantity of raw material gas in a raw material gas flow quantity controller 22 of the conventional apparatus. As the raw material gas flow quantity controller 22, a mass flow controller is usually used, and the mass flow controller is designed so as to regulate a flow quantity of raw material gas to a predetermined flow quantity under PID control.

The PID control is a control scheme realized by a combination of proportional control, integral control, and differential control. It is considered that the PID control is the most presently excellent control scheme. This control scheme needs several seconds to control the flow quantity of raw material gas to a predetermined flow quantity. In the initial stage of the process, the flow quantity repeats overshoots and undershoots and finally reaches the predetermined flow quantity. This initial fluctuation of the flow quantity is inevitable. Initial fluctuation time $\Delta T$ reaches several seconds.

According to a research conducted by the inventors of the present application, it becomes clear that initial fluctuation of the raw material gas flow quantity had a significant influence on the initial growth of the carbon nanostructure 8. The carbon nanostructure 8 is nano-sized. Accordingly, a growth time of the carbon nanostructure 8 is extremely short. Under synthesis conditions where growth of the carbon nanostructure 8 is stopped in several seconds, the initial fluctuation of the raw material gas flow quantity has adverse effect of synthesizing carbon nanostructures. In view of this, a way of preventing the initial fluctuation of the raw material gas was devised.

FIG. 20 is a schematic block diagram of a carbon nanostructure synthesis apparatus 50 which is a second conventional art. A configuration of the carbon nanostructure synthesis apparatus 50 is the same as that of the carbon nanostructure synthesis apparatus 50 in FIG. 18 except that the raw material gas valve 52 is replaced with a manual three-way valve 54.

In this conventional art, the manual three-way valve 54 is used for the purpose of avoiding the initial fluctuation of the raw material gas. The raw material gas flow quantity controller 22 controls a flow quantity of the raw material gas to a predetermined flow quantity. In an interruption state of the raw material gas of this predetermined flow quantity, the raw material gas is exhausted to a supplemental exhaust pipe 54b in a direction indicated by an arrow a.

To feed the raw material gas to the reaction chamber 4, the manual three-way valve 54 is switched by manual operation, and the raw material gas of a predetermined flow quantity is fed to an injection pipe 54a in a direction indicated by an arrow b. With this arrangement, effects of initial fluctuation time $\Delta T$ under PID control can be avoided. However, another problem arises.

FIG. 21 is a time series graph showing slowness of opening/closing the conventional manual three-way valve for a raw material gas flow quantity. Manually switching the manual three-way valve 54 takes time. In feeding raw material gas, an opening operation for switching from the direction indicated by the arrow a to the direction indicated by the arrow b occurs a rising time $\Delta T_1$. Similarly, in interrupting raw material gas, a closing operation for switching from the direction indicated by the arrow b to the direction indicated by the arrow a occurs a fall time $\Delta T_2$.

Especially, the rising time $\Delta T_1$ causes instability of flow quantity in an initial stage, which is a factor adversely affecting initial growth stage of the carbon nanostructure 8. When the growth time of the carbon nanostructure 8 is long, the fall time $\Delta T_2$ does not have so large influence on the growth of the carbon nanostructure 8, but the rising time $\Delta T_1$ has some influence on the growth of the carbon nanostructure 8.

As is apparent from the first conventional art and the second conventional art, in initiating feed of raw material gas, existence of the initial fluctuation time $\Delta T$ and the rising time $T_1$ of the raw material gas flow quantity adversely affects initial growth of carbon nanostructures. In addition, distortion of the initial growth might inhibit the flowing growth even after some time.

Therefore, the present invention provides method and apparatus for high-efficiency synthesis of carbon nanostructure which eliminates the initial fluctuation time and rising time of raw material gas flow quantity at the feed of raw material gas, and instantaneously initiates the contact between raw material gas and a catalyst under the reaction conditions so as not to adversely affect the initial growth of the carbon nanostructures, and an object of the present invention is to produce a high-purity carbon nanostructure.

DISCLOSURE OF INVENTION

The present invention has been attained to solve the foregoing problem, and a first mode of the present invention is a high-efficiency synthesis method of a carbon nanostructure, the method comprising: bringing raw material gas and a catalyst into contact with each other under reaction conditions so as to produce a carbon nanostructure, wherein: initiation of the contact between the raw material gas and the catalyst is carried out instantaneously. Reaction conditions such as temperature and raw material gas concentration are set so as to meet those for catalyst growth, and under the reaction conditions, initiation of the contact between raw material gas and a catalyst is carried out instantaneously. Consequently, there occur no initial fluctuations and no slow rise in concentration (flow quantity) of the raw material gas, and this enables active initial growth of carbon nanostructure. This realizes not only high-efficiency height growth and thickness growth of carbon nanostructure, but also high-density growth and short-period high-speed growth of carbon nanostructure. The foregoing catalyst includes catalysts of any forms, such as catalyst substrate, catalyst structure, catalyst powders, and catalyst pellet.

"Instant" in the present invention means an instant at which control can be performed with a high-speed valve, such as electromagnetic valve, and means an instant at which the high-speed valve is switched from on position to off position for gas injection, or an instant at which the high-speed valve is switched from off position to on position. The high-speed valve, which is not limited to an electromagnetic valve, includes all non-manual high-speed valves. More specifically, in a case when carbon nanostructure is grown within 0.1 seconds, "instant" of the present invention is a switching time of the high-speed valve which is controlled its opening and closing within a sufficiently shorter time than 0.1 seconds.

A second mode of the present invention is the method in the first mode, wherein: the initiation of the contact is carried out instantaneously in such a manner that feed of the raw material gas to the catalyst that is stationary is initiated instantaneously. Feed of raw material gas flow to the catalyst placed stationary in a reaction chamber, is controlled at a high speed in a short period under electronic control, computer control, or the like. Therefore, the raw material gas of a predetermined flow quantity (predetermined concentration) comes into contact with the catalyst at a burst, which promotes initial growth of carbon nanostructure. This realizes not only high-efficiency height growth and thickness growth of carbon nanostructure, but also high-density growth and short-period high-speed growth of carbon nanostructure. The arrangement where the catalyst is made stationary is preferable for catalyst substrate and catalyst structure.

A third mode of the present invention is the method in the first mode, wherein: the initiation of the contact is carried out instantaneously in such a manner that under a condition where the raw material gas is circulated, the catalyst is caused to move from outside the raw material gas to inside the raw material gas. For example, there is a system in which the reaction chamber is separated into two areas: an area where raw material gas flow passes; and the other area where no raw material gas flow passes, and when the raw material gas of a predetermined flow quantity is circulated, the catalyst placed in the area where no raw material gas passes is instantaneously moved to the area where the raw material gas flow passes in a mechanical manner. Further, other systems are included, such as a system in which catalyst powders are sprayed instantaneously to the raw material gas flow. Instantaneous movement or instantaneous spraying causes an instantaneous initiation of the contact between the catalyst and the raw material gas, and thus promotes initial growth of carbon nanostructure. This realizes not only high-efficiency height growth and thickness growth of carbon nanostructure, but also high-density growth and short-period high-speed growth of carbon nanostructure.

The fourth mode of the present invention is the method in the first mode, wherein: the contact is instantaneously initiated in such a manner that under a condition where the raw material gas is built up, the catalyst is caused to move from outside the raw material gas to inside the raw material gas. For example, the initiation of the contact between the catalyst and the raw material gas can be carried out instantaneously in such a manner that under a condition where the raw material gas of a predetermined concentration is filled in the reaction chamber and where the catalyst is placed in an area that is mechanically isolated from the reaction chamber, the catalyst is instantaneously moved to the reaction chamber mechanically. Further, instantaneous spraying the catalyst powders into the reaction chamber enables instantaneous contact between the catalyst and the raw material gas. Such instantaneous movement or instantaneous spraying causes an instantaneous initiation of the contact between the catalyst and the raw material gas and thus promotes initial growth of carbon nanostructure. This realizes not only high-efficiency height growth and thickness growth of carbon nanostructure, but also high-density growth and short-period high-speed growth of carbon nanostructure.

A fifth mode of the present invention is the method in the first mode, wherein: the contact is instantaneously initiated under the reaction conditions in such a manner that under a condition where the catalyst is placed in the raw material gas that is built up, a temperature of the catalyst or a temperature in a vicinity of the catalyst is instantaneously increased to a reaction temperature. In temperatures that are less than the temperature at which the catalyst decomposes the raw material gas, no carbon nanostructure grows even when there occurs the contact between the catalyst and the raw material gas. Therefore, under the situation in which the raw material gas and the catalyst are placed in contact with each other in temperatures that are less than the catalyst decomposing temperature, when a temperature of the catalyst or a temperature in the vicinity of the catalyst is heated to the catalyst decomposing temperature or above, reaction conditions for growth of the carbon nanostructure are instantaneously satisfied. Consequently, the contact between the catalyst and the raw material gas under the foregoing reaction conditions can occur instantaneously. To realize an instantaneous temperature rise, it is effective that the catalyst is subjected to beam irradiation such as laser beam irradiation, infrared beam irradiation, electron beam irradiation, or ion beam irradiation. However, any other known heating methods can be applied. This method causes instantaneous initiation of the contact between the catalyst and the raw material gas, and thus promotes initial growth of carbon nanostructure. This realizes not only high-efficiency height growth and thickness growth of carbon nanostructure, but also high-density growth and short-period high-speed growth of carbon nanostructure.

A sixth mode of the present invention is the method in the foregoing first through fifth modes, wherein stopping of the contact between the raw material gas and the catalyst under the reaction condition is carried out instantaneously. When a growth time of carbon nanostructure is a long time, fluctuations of raw material gas concentration at the end of the contact does not affect so much completed form of carbon nanostructure. However, when a growth time of carbon nanostructure is a short time, fluctuations of raw material gas concentration at the end of the contact does not affect so much completed form of carbon nanostructure. The sixth mode prevents fluctuations of the concentration in such a manner that under short-time growth condition, the contact between the raw material gas and the catalyst is performed instantaneously, thus realizing production of carbon nanostructures in excellent form.

A seventh mode of the present invention is a high-efficiency synthesis method of a carbon nanostructure, the method comprising: feeding carrier gas and raw material gas to a reaction chamber so as to produce a carbon nanostructure by catalysis, wherein: in initiating the feed of the raw material gas, the raw material gas is instantaneously fed by a predetermined flow quantity. In the present invention, a flow quantity of the raw material gas to be fed is instantaneously risen to a predetermined flow quantity so that the raw material gas is fed to the reaction chamber. Therefore, there occur no initial fluctuations and no slow rise of the raw material gas flow quantity at the feed of the raw material gas, and this enables active initial growth of carbon nanostructure. This realizes not only high-efficiency height growth and thickness growth of carbon nanostructure, but also high-density growth and short-period high-speed growth of carbon nanostructure.

An eighth mode of the present invention is a high-efficiency synthesis method of a carbon nanostructure, the method comprising: feeding carrier gas and raw material gas to a reaction chamber so as to produce a carbon nanostructure by catalysis, wherein: a total flow quantity of the carrier gas and the raw material gas is controlled to be constant all the time in such a manner that in instantaneously initiating feed of the raw material gas of a predetermined flow quantity, a flow quantity of the carrier gas is instantaneously decreased proportionately, whereas in instantaneously interrupting feed of the raw material gas, a flow quantity of the carrier gas is instantaneously increased proportionately. According to this method, the raw material gas is interrupted with only the carrier gas circulated, and the raw material gas is fed with the carrier gas decreased by feed volume of the raw material gas. Therefore, a total gas flow quantity of the carrier gas and the material gas is maintained constant all the time during interruption of the raw material gas and during feed of the raw material gas. The fact that a constantly maintained flow quantity of gas on the surface of the catalyst before and after the initiation of raw material gas feed can accelerate initial growth of carbon nanostructure after feed of the raw material gas, has been first found by the inventors of the present application. The present invention has been attained based on this finding. Especially, in a short-time growth of carbon nanostructures, constancy in gas flow quantity (flow quantity of carrier gas+flow quantity of raw material gas) is an extremely important element. Maintaining constancies in pressure and temperature in the reaction chamber as well as constancy of the gas flow quantity brings about the effect of further promoting the growth of carbon nanostructure. In addition, it is preferable that there are no fluctuations in physicochemical conditions of the reaction chamber.

A ninth mode of the present invention is a high-efficiency synthesis method of a carbon nanostructure, the method comprising: feeding carrier gas and raw material gas to a reaction chamber so as to produce a carbon nanostructure by catalysis, wherein: a total flow quantity of the carrier gas and the raw material gas is controlled to be constant all the time in such a manner that in a reaction process, feed flow quantity levels of the raw material gas are changed in a plurality of levels, and when the feed flow quantity of the raw material gas is instantaneously increased or decreased by some quantity, a feed flow quantity of the carrier gas is instantaneously decreased or increased proportionately. For example, under a condition where the total flow quantity is set to Q, in order to change a feed flow quantity of the raw material gas in two flow quantity levels $q_1$ and $q_2$, it is necessary to change a feed flow quantity of the carrier gas into two flow quantity levels $Q-q_1$ and $Q-q_2$. Naturally, when no raw material gas is fed, a flow quantity of the carrier gas is set to Q. In this manner, when a feed flow quantity of the raw material gas is controlled in a plurality of levels, the total flow quantity is also controlled to be constant all the time. Therefore, there is the advantage that it is possible to efficiently synthesize carbon nanostructures even when a flow quantity of the raw material gas is changed.

A tenth mode of the present invention is a high-efficiency synthesis apparatus of a carbon nanostructure, which feeds carrier gas and raw material gas to a reaction chamber so as to produce a carbon nanostructure by catalysis, the apparatus comprising: means for feeding, to the reaction chamber, the carrier gas which is controlled to be of a basic flow quantity; and an electromagnetic three-way valve which instantaneously feeds or interrupts the raw material gas which is controlled to be of a predetermined flow quantity, with respect to the reaction chamber, wherein: at the time of interrupting the raw material gas, the electromagnetic three-way valve is instantaneously switched to exhaust position so that feed of the raw material gas is interrupted, and at the time of feeding the raw material gas, the electromagnetic three-way valve is instantaneously switched to feed position so that the raw material gas of a predetermined flow quantity is fed to the reaction chamber. Since the raw material gas which is controlled to be of a predetermined quantity is exhausted during interruption of the raw material gas, and the raw material gas is instantaneously fed to the reaction chamber by using the electromagnetic three-way valve at the time of feeding the raw material gas, feed and interruption of the raw material gas can be instantaneously carried out by electromagnetic force. Therefore, the raw material gas can be fed with its flow quantity instantaneously risen to a predetermined flow quantity, which eliminates variations in flow quantity at the initial feed of the raw material gas. As a result of this, there is the advantage that initial growth of carbon nanostructure is promoted, and the promotion brings promoting middle-stage growth of carbon nanostructure.

An eleventh mode of the present invention is a high-efficiency synthesis apparatus of a carbon nanostructure, which feeds carrier gas and raw material gas to a reaction chamber so as to produce a carbon nanostructure by catalysis, the apparatus comprising: means for feeding, to the reaction chamber, the carrier gas which is controlled to be of a basic flow quantity; a first electromagnetic three-way valve which instantaneously feeds or interrupts the raw material gas which is controlled to be of a predetermined flow quantity, with respect to the reaction chamber; and a second electromagnetic three-way valve which instantaneously feeds or interrupts the carrier gas whose flow quantity is controlled to be the same as the predetermined flow quantity of the raw material gas, with respect to the reaction chamber, wherein: a total flow quantity of the carrier gas and the raw material gas, which is fed to the reaction chamber including the carrier gas of the basic flow quantity, is controlled to be constant in such a manner that at the time of feeding the raw material gas with the first electromagnetic three-way valve, the carrier gas is interrupted with the second electromagnetic three-way valve, and at the time of interrupting the raw material gas with the first electromagnetic three-way valve, the carrier gas is fed with the second electromagnetic three-way valve. According to this apparatus, not only the raw material gas of a predetermined flow quantity can be fed instantaneously, but also the total flow quantity before and after feed of the raw material gas can be maintained constant. This ensures constancy in gas flow quantity and constancy in gas pressure on the surface of the catalyst, and thus brings the effect of promoting initial growth of carbon nanostructure at the time of initial feed of the raw material gas. For example, in order to grow carbon nanostructure with a low density on the catalyst substrate, a raw material gas feed time must be short. In view of this, the present invention is highly effective because the present invention strongly promotes initial growth of the raw material gas.

A twelfth mode of the present invention is a high-efficiency synthesis apparatus of a carbon nanostructure, which feeds carrier gas and raw material gas to a reaction chamber so as to produce a carbon nanostructure by catalysis, the apparatus comprising: means for feeding, to the reaction chamber, the carrier gas which is controlled to be of a basic flow quantity; a plurality of first electromagnetic three-way valves, provided in parallel with each other, which instantaneously feed or interrupt the raw material gas at respective feed flow quantity levels, so that feed flow quantity levels of the raw material gas are changed in a plurality of levels; and a plurality of second electromagnetic three-way valves, provided in parallel with each other, which instantaneously feed or interrupt the carrier gas at respective feed flow quantity levels with respect to the reaction chamber, so that feed flow quantity levels of the carrier gas are changed in a plurality of levels that are numerically equal to the feed flow quantity levels of the raw material gas, wherein: a total flow quantity of the carrier gas and the raw material gas, which is fed to the reaction chamber including the carrier gas of the basic flow quantity, is controlled to be constant in such a manner that at the time of gas feed, at least one necessary electromagnetic three-way valve among the first electromagnetic three-way valves and the second electromagnetic three-way valves is switched to gas feed position, and the other electromagnetic three-way valves are switched to gas interruption position. The present invention is an apparatus in which when feed flow quantity levels of the raw material gas are changed in two or more levels, the total flow quantity is maintained constant all the time, and provides a high-density and high-efficiency synthesis apparatus of a carbon nanostructure in which realization of both instantaneous feed initiation of the raw material gas and a constant total flow quantity brings an active initial growth of carbon nanostructure.

A thirteenth mode of the present invention is a carbon nanostructure which is produced by using the high-efficiency synthesis method of a carbon nanostructure according to any one of first through ninth modes. According to the present invention, since initiation and stopping of the reaction between the catalyst and the raw material gas can be carried out instantaneously, high-purity carbon nanostructures of various kinds can be synthesized with high efficiency. Examples of the carbon nanostructure include carbon nanotubes, carbon nanotubes with beads, brush-type carbon nanotubes that are a forest of carbon nanotubes, carbon nanotwists that are carbon nanotubes having twists, carbon nanocoils in coil form, and fullerenes in spherical shell form.

A fourteenth mode of the present invention is the carbon nanostructure, in the thirteenth mode, which is a brush-type carbon nanotube and is realized by a high-purity carbon nanotube, grown with high density, mainly composed of graphene sheets in an outermost layer of the carbon nanotube. With the use of a catalyst structure like a catalyst substrate as a catalyst, it is possible to grow carbon nanotubes with high density in a standing manner on the catalyst. Generally, in a long-time growth, a carbon nanotube having a graphene sheet inside and amorphous carbon on top of the graphene sheet is produced. That is, the carbon nanotube has the following two layers: graphite layer and amorphous layer. In the present invention, the contact with the raw material gas can be initiated and stopped instantaneously. This enables a short-period growth control, thus realizing to produce high-purity carbon nanotubes that has no amorphous layer or that hardly has amorphous layer.

A fifteenth mode of the present invention is the carbon nanostructure, in the fourteenth mode, wherein the growth is completed within 100 seconds. When a time of the contact between the catalyst and the raw material gas is controlled to a desired time, especially a time within 100 seconds, it is possible to grow high-purity carbon nanotubes in brush forms with high density. This is realized by arbitrary time within 100 seconds. However, 0.01-60 seconds realizes carbon nanotubes containing almost no impurities.

A sixteenth mode of the present invention is the carbon nanostructure, in the fourteenth mode, in which when the brush-type carbon nanotube is cleaved in arbitrary cross section, there appear thread-type carbon nanotubes in the cross section. In the present invention, carbon nanotubes grow with high density. In many cases, this is realized in such a manner that carbon nanotubes grow in contact with one another and bind to one another on their surfaces by intermolecular force. As a result of this, when the brush-type carbon nanotube is cleaved in arbitrary cross section, there appear thread-type carbon nanotubes in the cross section caused by their attractive forces. The appearance of the thread-type carbon nanotubes proves high-density growth. Accordingly, the appearance of the thread-type carbon nanotubes proves that the method of the present invention realizes production of carbon nanotubes.

BEST MODE FOR CARRYING OUT THE INVENTION

With reference to drawings, the following will describe in detail an embodiment of a high-efficiency synthesis method and apparatus of carbon nanostructure according to the present invention.

Figure 1:
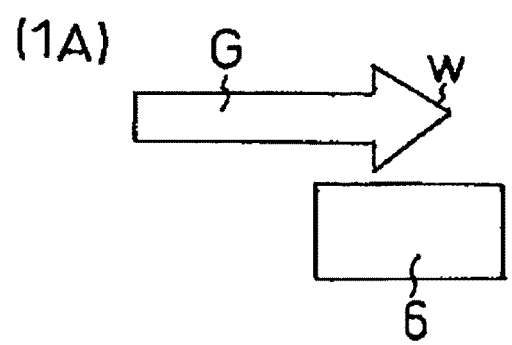
FIG. 1A is a schematic explanatory diagram showing a high-efficiency synthesis method of instantaneously feeding and interrupting raw material gas G with respect to a stationary catalyst support 6.
FIG. 1B is a schematic explanatory view showing a high-efficiency synthesis method of moving the catalyst support 6 into the circulated raw material gas G from the outside.
Figure 1:
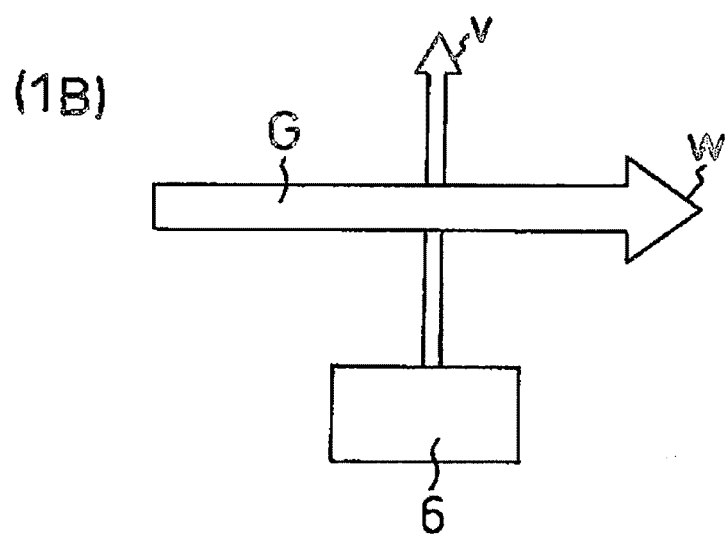

FIG. 1(1A) is a schematic explanatory diagram of a high-efficiency synthesis method in which a raw material gas G to a stationary catalyst support 6 is instantaneously fed and interrupted. The catalyst support 6 typifies catalysts of any forms, such as catalyst substrate, catalyst structure, pellet catalyst, and catalyst powders. To the catalyst support 6, the raw material gas G is instantaneously fed in a direction indicated by an arrow w, and then instantaneously interrupted. Reaction conditions such as flow quantity (or concentration) of raw material gas and an environmental temperature are set so as to meet those for growth of carbon nanostructure. Under the reaction conditions, the initiation of feed of the raw material gas is carried out instantaneously, and the interruption of the raw material gas is carried out instantaneously. Only for a time period during which the raw material gas is fed, carbon nanostructure can grow. In a short-period growth, instantaneous feed and instantaneous interruption are highly effective. Feed and interruption of raw material gas flow can be controlled at a high speed in a short period under electronic control, computer control, or the like. Especially, instantaneous feed causes no initial fluctuations and no slow rise in concentration (flow quantity) of raw material gas, and enables active initial growth of carbon nanostructure. This realizes not only high-efficiency height growth and thickness growth of carbon nanostructure, but also high-density growth and short-period high-speed growth of carbon nanostructure. Details thereof will be described later with reference to FIGS. 3 through 18.

FIG. 1(1B) is a schematic explanatory diagram of a high-efficiency synthesis method in which the catalyst support 6 is moved into a flowing raw material gas G from outside. The catalyst support 6 typifies catalysts of any forms, such as catalyst substrate, catalyst structure, pellet catalyst, and catalyst powders. Under a situation where the raw material gas G is flown in a direction indicated by an arrow w, the catalyst support 6 is made moved in a direction indicated by an arrow v with respect to the flow of the raw material gas. When movement of the catalyst support 6 is performed under manual control, electronic control, computer control, or the like, contact between the catalyst support 6 and the raw material gas is initiated instantaneously. The movement of the catalyst support 6 includes a mechanical movement and spraying powders of the catalyst support 6. As to interruption of the contact, in the case of the mechanical movement, the catalyst support 6 is only separated from the flow of the raw material gas. In the case of spraying catalyst powders, interruption can be instantaneously controlled in a short period through absorption and collection, or other operation. Instantaneous movement, or instantaneous splaying and instantaneous collection enables instantaneous initiation and stopping of the contact between the catalyst and the raw material gas. This realizes a short-period growth of carbon nanostructure, thus enabling production of high purity carbon nanostructure.

Figure 2:
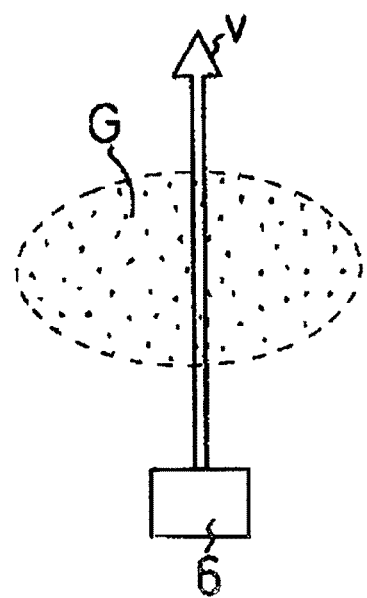
FIG. 2A is a schematic explanatory diagram showing a high-efficiency synthesis method of instantaneously moving the catalyst support 6 into the raw material gas G that is built up in a reaction chamber.
FIG. 2B is a schematic explanatory diagram showing a high-efficiency synthesis method in which the catalyst support 6 is placed stationary in the raw material gas G built up in the reaction chamber and a reaction temperature is accomplished instantaneously.
Figure 2:
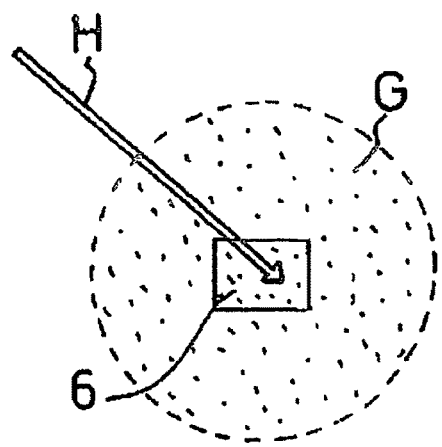

FIG. 2(2A) is a schematic explanatory diagram of a high-efficiency synthesis method in which the catalyst support 6 is instantaneously moved into the raw material gas G which is built up in a reaction chamber. The catalyst support 6 typifies catalysts of any forms, such as catalyst substrate, catalyst structure, pellet catalyst, and catalyst powders. The raw material gas G is built up in a reaction chamber, and the catalyst support 6 is made moved into the built-up raw material gas G in a direction indicated by an arrow v. Concentration of the raw material gas and gas temperature are set to reaction conditions. For example, the raw material gas G of a predetermined concentration is filled in the reaction chamber. The catalyst support 6 is placed in an area that is mechanically isolated from the reaction chamber. Then, when the catalyst support 6 is instantaneously moved to the reaction chamber mechanically, contact between the catalyst support 6 and the raw material gas G is initiated instantaneously. This ensures instantaneous initiation of the growth. Further, instantaneous spraying the catalyst powders into the reaction chamber enables instantaneous contact between the catalyst and the raw material gas G. Such instantaneous movement or instantaneous spraying causes an instantaneous initiation of the contact between the catalyst and the raw material gas and thus promote an initial growth of carbon nanostructure. This realizes not only high-efficiency height growth and thickness growth of carbon nanostructure, but also high-density growth and short-period high-speed growth of carbon nanostructure.

FIG. 2(2B) is a schematic explanatory diagram of a high-efficiency synthesis method in which the catalyst support 6 is placed stationary in the raw material gas G built up in a reaction chamber and a reaction temperature is accomplished instantaneously. In practice, a temperature of the catalyst support 6 or a temperature in the vicinity of the catalyst support 6 is risen up to a reaction temperature. Under normal circumstances, in temperatures that are less than the temperature at which the catalyst decomposes the raw material gas, no carbon nanostructure grows even when there occurs the contact between the catalyst support 6 and the raw material gas G. Therefore, under the situation in which the raw material gas G and the catalyst support 6 are placed in contact with each other in temperatures that are less than the catalyst decomposing temperature, when a temperature of the catalyst or a temperature in the vicinity of the catalyst is heated to the catalyst decomposing temperature or above, reaction conditions for growth of the carbon nanostructure are instantaneously satisfied. Consequently, the contact between the catalyst support 6 and the raw material gas G under the foregoing reaction conditions can occur instantaneously. To realize an instantaneous temperature rise, it is effective that the catalyst support 6 is subjected to beam irradiation H such as laser beam irradiation, infrared beam irradiation, electron beam irradiation, or ion beam irradiation. However, any other known heating methods can be applied. Such a method causes an instantaneous initiation of the contact between the catalyst support 6 and the raw material gas G and thus promote an initial growth of carbon nanostructure. This realizes not only high-efficiency height growth and thickness growth of carbon nanostructure, but also high-density growth and short-period high-speed growth of carbon nanostructure. Stopping beam irradiation causes a rapid temperature drop of the catalyst support 6, thus stopping the growth of carbon nanostructure.

Figure 3:
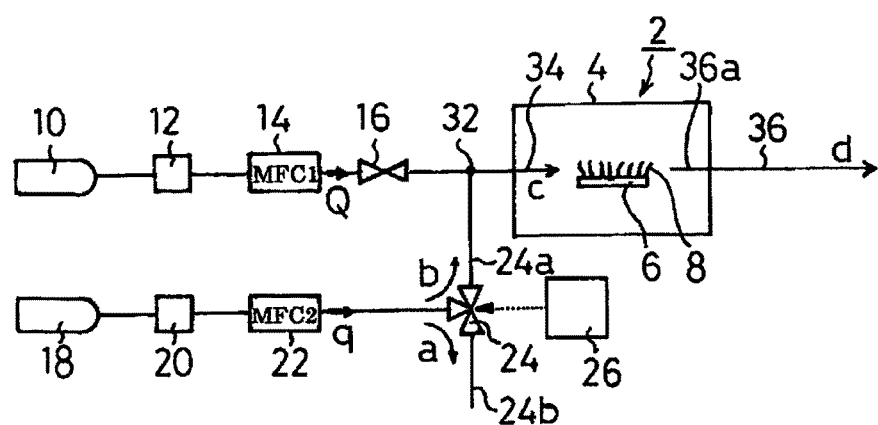
FIG. 3 is a schematic block diagram of a high-efficiency synthesis apparatus of carbon nanostructure in First Embodiment according to the present invention.

Referring to FIGS. 3 through 18, the following will describe in detail an intermittent control of the raw material gas flow described with reference to (1A). FIG. 3 is a schematic block diagram of a high-efficiency synthesis apparatus of carbon nanostructure in First Embodiment according to the present invention. A high-efficiency synthesis apparatus 2 is an apparatus for producing carbon nanostructure by using the CCVD method. The catalyst support 6 is placed in a reaction chamber 4. On the surface of the catalyst support 6, carbon nanostructure 8 grows by catalyst chemical vapor deposition. In the First Embodiment, carbon nanotube is shown as the carbon nanostructure 8.

The catalyst support 8 is a base substance having a catalyst provided on its surface. The base substance may take a number of forms such as substrate, multi-layer substrate, cylinder, polyhedron, pellet, or powders. A catalyst for use is different depending upon the type of the carbon nanostructure 8. Examples of the catalyst includes various kinds of known catalysts such as iron, cobalt, nickel, ferroalloy, cobalt alloy, nickel alloy, iron oxide, cobalt oxide, nickel oxide, and combination of the foregoing substances.

From a carrier gas container 10, carrier gas such as inactive gas is fed. A pressure of the carrier gas is reduced to a predetermined pressure by a regulator 12. A flow quantity of the pressure-reduced carrier gas is controlled to be a basic flow quantity Q by a carrier gas flow quantity controller 14 which is realized by a massflow controller (MFC1), and the carrier gas is then fed to a merge section 32 via a carrier gas valve 16 which is realized by a two-way valve.

As this carrier gas, gas such as He, Ne, Ar, $N_2$, or $H_2$ is used. The carrier gas is a gas carrying raw material gas. The raw material gas is exhausted by reaction, whereas the carrier gas is not exhausted without any reaction.

Further, from a raw material gas container 18, raw material gas is fed. A pressure of the raw material gas is reduced to a predetermined pressure by a regulator 20. A flow quantity of the pressure-reduced raw material gas is controlled to be a predetermined flow quantity q by a raw material gas flow quantity controller 22 which is realized by a massflow controller (MFC2). This raw material gas is fed via an electromagnetic three-way valve 24.

As this raw material gas, not only hydrocarbon but also organic gas such as sulfur-containing organic gas or phosphate-containing organic gas is widely used. Selected as the raw material gas is organic gas favorable for production of carbon nanostructure of a specific structure. Among organic gases, hydrocarbon is favorable because it does not produce unwanted substance.

Examples of hydrocarbon include alkane compounds such as methane and ethane; alkene compounds such as ethylene and butadiene; alkyne compounds such as acetylene; aryl hydrocarbon compounds such as benzene, toluene, and styrene; condensed-ring aromatic hydrocarbons such as indene, naphthalene, and phenanthrene; cycloparaffin compounds such as cyclopropane and cyclohexane; cycloolefin compounds such as cyclopentene; and condensed-ring alicyclic hydrocarbon compounds such as steroid. Also, a mixed hydrocarbon gas can be used. The mixed hydrocarbon gas is a mixture of two or more types of the foregoing hydrocarbon compounds. Particularly, among hydrocarbons, a low-molecular hydrocarbon is desired. For example, acetylene, allylene, ethylene, benzene, or toluene is favorable.

Next, the following will describe a feature of the present invention, the electromagnetic three-way valve 24. The electromagnetic three-way valve 24 is controlled in two ways of interruption state and feed state by operation of an automatic valve controller 26. That is, in an interruption state of raw material gas, the raw material gas is exhausted to a supplemental exhaust pipe 24b in a direction indicated by an arrow a. In a feed state of a raw material gas, the raw material gas is fed to an injection pipe 24a in a direction indicated by an arrow b, and the raw material gas is mixed with the carrier gas in the merge section 32.

With the use of the electromagnetic three-way valve 24, there occur no initial fluctuations of the raw material gas when a direction of the raw material gas is switched to the direction indicated by the arrow b since a flow quantity of the raw material gas has been already controlled to be a predetermined flow quantity q. In addition, the switching to the direction indicated by the arrow b is performed by electromagnetic action. Because of this, the switching is performed instantaneously. Thus, there occurs no slow initial rise of the raw material gas, and the raw material gas of the predetermined flow quantity q is fed at a burst.

In switching from the feed state of the raw material gas to the interruption state of the raw material gas, it is possible to instantaneously switch from the flow quantity q to a flow quantity 0 by electromagnetic action of the automatic valve controller 26. Therefore, there occurs no slow initial rise of the raw material gas. Thus, the use of the electromagnetic three-way valve 24 enables instantaneous feed of the raw material gas to the reaction chamber 4 and instantaneous interruption of the raw material gas. In addition, there exist no fluctuations in flow quantity of the raw material gas in the process of switching from the feed state to the interruption state, and vice versa.

The carrier gas and the raw material gas are mixed in the merge section 32. Then, a mixture of the carrier gas and the raw material gas is fed to the reaction chamber 4 through a gas feed nozzle 34. The reaction chamber 4 is heated at a temperature in such a range that is most likely to produce carbon nanostructure. The raw material gas is thermally decomposed in the vicinity of the catalyst support 6, and a decomposition product grows into the carbon nanostructure 8 on the surface of the catalyst support 6.

In FIG. 3, in the catalyst chemical vapor deposition, thermal decomposition was adopted to decompose the raw material gas. However, this is not the only possibility, and other decomposition may be adopted, such as laser-beam decomposition, electron-beam decomposition, ion-beam decomposition, or plasma decomposition. In any of these decompositions, the decomposition product grows into the carbon nanostructure 8 on the surface of the catalyst support 6.

However, on the surface of the catalyst support 6, part of the raw material gas is converted into carbon nanostructure, and non-reactive part of the raw material gas, which has not contributed to the reaction, flows together with the carrier gas from a delivery pipe edge part 36a to a gas delivery pipe 36 in a direction indicated by an arrow d.

Figure 4:
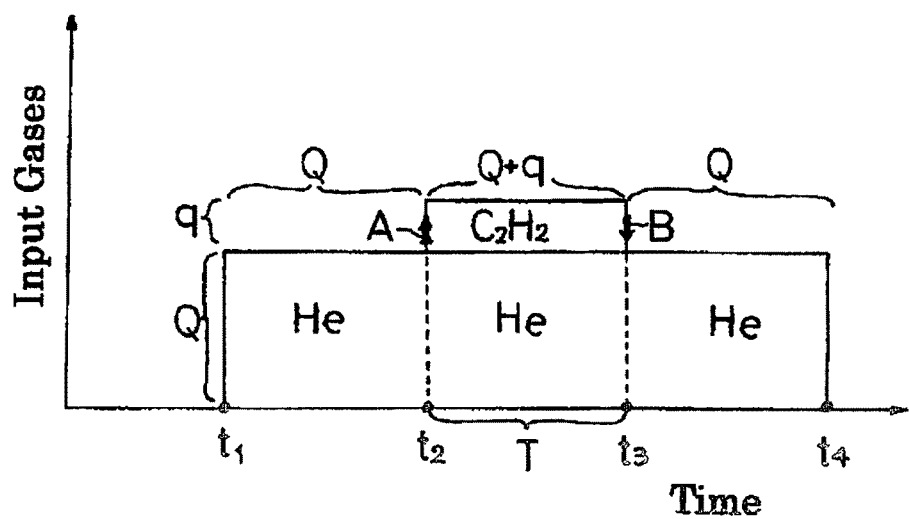
FIG. 4 is a time series graph of flow quantity of gas in the First Embodiment of the present invention.

FIG. 4 is a time series graph of flow quantity of gas in the First Embodiment of the present invention. In the First Embodiment and the following embodiments, helium (He) is used for the carrier gas, and acetylene ($C_2H_2$) is used for the raw material gas. Although He is shown in drawings, a general carrier gas can be applied. Similarly, although $C_2H_2$ is shown in drawings, a general raw material gas can be applied. During the time between $t_1$ and $t_2$, the carrier gas of the basic flow quantity Q is fed, and the raw material gas is interrupted. Accordingly, a total flow quantity of the carrier gas and the raw material gas is Q.

At time $t_2$, the raw material gas is fed, and the raw material gas of the predetermined flow quantity q instantaneously rises in a direction indicated by an arrow A. Accordingly, a total flow quantity is Q+q. This state continues for the time between $t_2$ and $t_3$. At time $t_3$, the raw material gas is interrupted, and the raw material gas instantaneously falls in a direction indicated by an arrow B. A total flow quantity becomes equal to the basic flow quantity Q of the carrier gas. A raw material gas feed time T is equal to time $t_3-t_2$.

Figure 5:
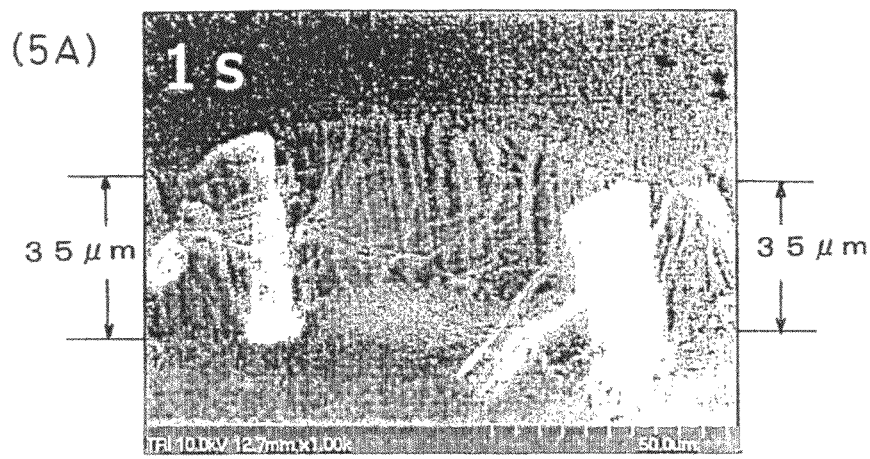
FIG. 5 is an SEM micrograph of a carbon nanotube, which is one type of the carbon nanostructure 8 grown in the First Embodiment of the present invention.
Figure 5:
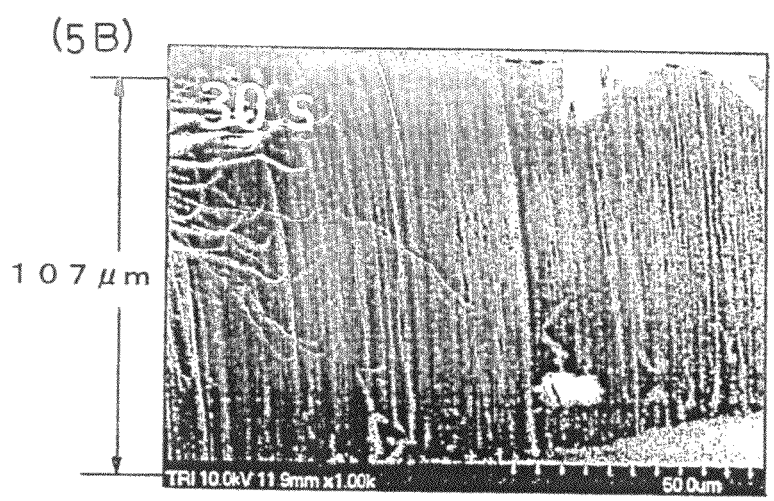

FIG. 5 is an SEM micrograph of a carbon nanotube, which is one type of the carbon nanostructure 8 grown in the First Embodiment of the present invention. Conditions for growth of the carbon nanotube are as follows: A flow quantity Q of a carrier gas was 200 sccm, and a flow quantity q of a raw material gas was 60 sccm. In the reaction chamber 4, a temperature was controlled to 700° C., and a pressure was maintained to atmospheric pressure ($1 \times 10^5$ Pa). In FIG. 5(5A), the raw material gas feed time T is 1(s). In FIG. 5(5B), the raw material gas feed time T is 30(s). Feed and interruption (i.e. on and off) by the electromagnetic three-way valve 24 enables feed of raw material gas for one second that is an extremely short time.

Even for T=1(s), the carbon nanotube grows with high density almost perpendicularly on the catalyst support 6. The carbon nanotube has a height H of 35 μm and grows with almost even height over the entire area of the catalyst support 6. Therefore, it is observed that the surface of the carbon nanotube group is flat and has mirror surface effects. For T=30(s), the carbon nanotube grows to a height H of 107 μm. In a long-time growth for more than several minutes, a thickness of the carbon nanotube as well as its height becomes large. As a matter of course, height evenness of the carbon nanotube and flatness and mirror surface effects of the surface of the carbon nanotube are maintained similarly.

Figure 6:
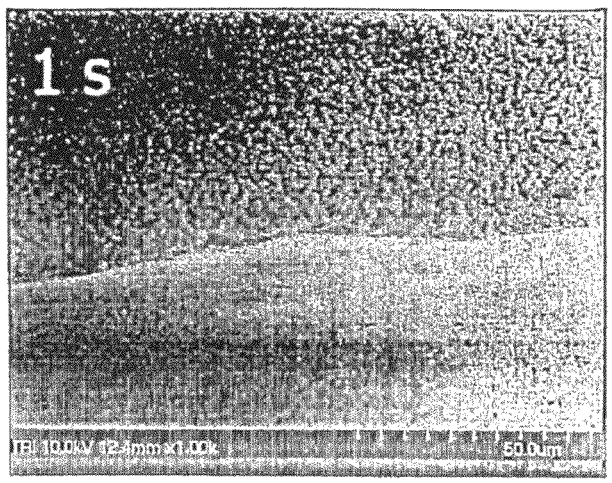
FIG. 6 is a SEM micrograph of a carbon nanotube which was grown by using the conventional manual three-way valve (FIG. 13), as a comparative example.
Figure 6:
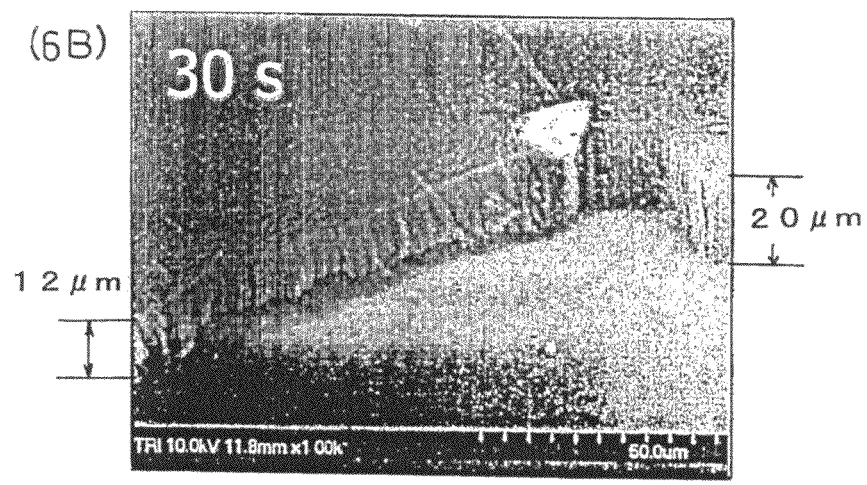
Figure 20:
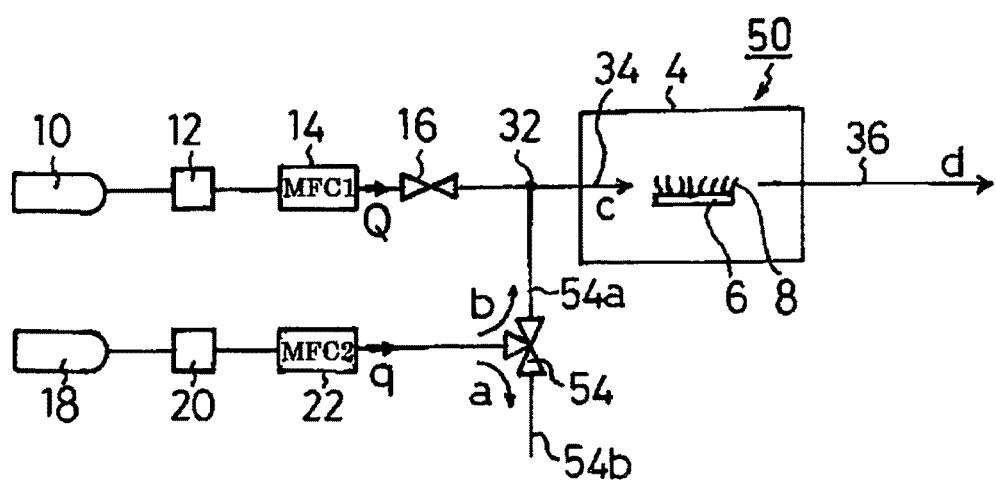
FIG. 20 is a schematic block diagram of a carbon nanostructure synthesis apparatus 50 which is a second conventional art.
Figure 21:
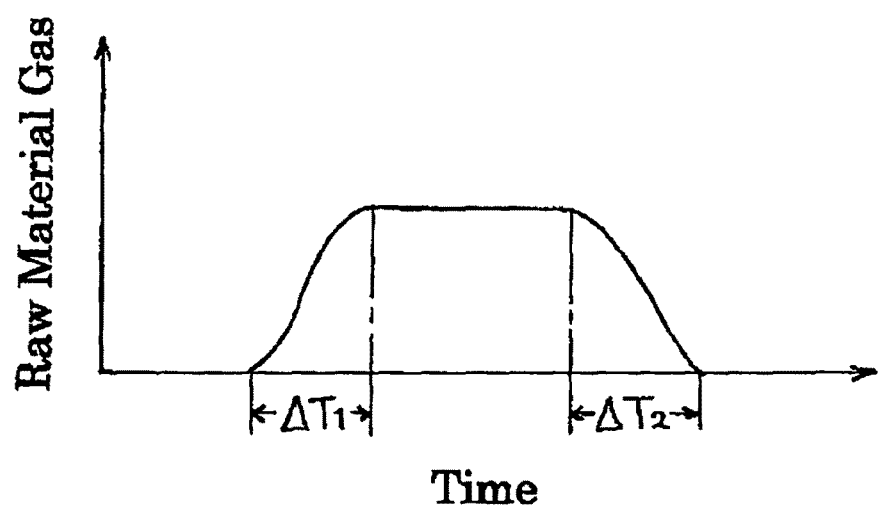
FIG. 21 is a time series graph showing slowness of opening/closing the conventional manual three-way valve for a raw material gas flow quantity.

FIG. 6 is a SEM micrograph of a carbon nanotube which was grown by using the conventional manual three-way valve (FIG. 20), as a comparative example. Conditions for growth of this carbon nanotube are as follows: A flow quantity Q of a carrier gas was 200 sccm, and a flow quantity q of a raw material gas was 60 sccm. In the reaction chamber 4, a temperature was controlled to 700° C., and a pressure was maintained to atmospheric pressure ($1 \times 10^5$ Pa). In FIG. 6(6A), the raw material gas feed time T is 1(s). In FIG. 6(6B), the raw material gas feed time T is 30(s).

In operation of the manual three-way valve 54, it is impossible to perform open and close operations within T=1(s) in principle, and it is extremely difficult to control a time between a rise time $T_1$ and a fall time $T_2$ of the raw material gas so as to be within 1 second. Therefore, it is clear that a flow quantity of the raw material gas considerably fluctuates for one second. Because of this fluctuation, as illustrated in FIG. 6(6A), carbon nanotube hardly grows.

In FIG. 6(6B), the raw material gas feed time is 30 seconds, but height H of the carbon nanotube varies ranging from 12 μm to 20 μm even in an area shown in FIG. 6(6B). In addition, the carbon nanotube did not grow so thick. It is considered that fluctuation of the flow quantity of the raw material gas caused by manual open and close operations considerably affected for 30 seconds, and thus decreased a growth rate of the carbon nanotube. Besides, it is clear that the surface of carbon nanotube group is poorly flat, and thus mirror surface effects cannot be obtained.

As a result of comparison between FIG. 5 and FIG. 6, it can be understood that change of the manual three-way valve 54 to the electromagnetic three-way valve 24 has a significant influence on growth of the carbon nanotube. It was verified that instantaneous feed of the raw material gas promotes growth of the carbon nanostructure 8 such as carbon nanotube.

The inventors of the present application studied that the result of growth with a height of 107 μm within 30 seconds, obtained in FIG. 6(6B), takes its place in what position, as compared with data that have been obtained so far in the world. A result of the study is shown in Table 1.

TABLE 1

Comparison in height growth and growth rate between carbon nanotubes

| <Dissertations> | <Height growth> | <Growth rate> |
| --- | --- | --- |
| Chem. Phys. Lett. 362(2002)385. | 1.5 mm(30 min) | ~50 μm/min |
| Appl. Phys. Lett. 77(2000)830. | 12 μm | ~6 μm/min |
| Nature 338(1997)52. | 40 μm | 3.3 μm/min |
| Science 282(1998)1105. | 50 μm | 2 μm/min |
| Our data | 107 μm (30 sec) | 214 μm/min |

(Inventors of the Present Application)

Mass synthesis of carbon nanotubes naturally requires speed-up of the growth. Data obtained by the inventors of the present application show that the growth rate in a height direction is higher than that of any data in the world. As a result of this, it can be understood that for realization of speed-up of the growth, essentially important are an instantaneous feed of the raw material gas and a constant flow quantity of the raw material gas fed, clarified by the present invention.

Figure 7:
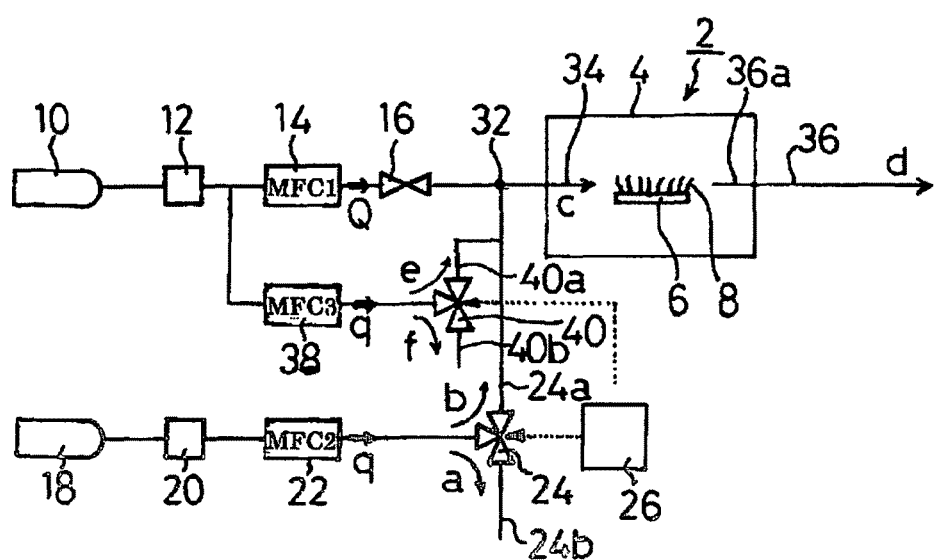
FIG. 7 is a schematic block diagram of a high-efficiency synthesis apparatus of carbon nanostructure in Second Embodiment according to the present invention.

FIG. 7 is a schematic block diagram of a high-efficiency synthesis apparatus of carbon nanostructure in Second Embodiment according to the present invention. This high-efficiency synthesis apparatus 2 is different from the high-efficiency synthesis apparatus 2 in First Embodiment in that it always maintains constant a total flow quantity of the carrier gas and the raw material gas. As to members having the same reference numerals as those described in the First Embodiment, explanations of their operations and effects are omitted, but explanation of additional members will be given.

The carrier gas is divided into carrier gas of the basic flow quantity Q and carrier gas of the predetermined flow quantity q. That is, the carrier gas flow quantity controller 14 controls a flow quantity of the carrier gas to be the basic flow quantity Q. At the same time, a flow quantity of separate carrier gas is controlled to be the predetermined flow quantity q by a carrier gas flow quantity controller (massflow controller MFC3) 38. The predetermined flow quantity q of the carrier gas is set to be equal to the predetermined flow quantity q of the raw material gas.

The carrier gas of the predetermined flow quantity q is subjected to feed and interruption controls by an electromagnetic three-way valve 40. In the feed state of the electromagnetic three-way valve 40, the carrier gas flows in a direction indicated by an arrow e. In the interruption state of the electromagnetic three-way valve 40, the carrier gas flows in a direction indicated by an arrow f. That is, in the feed state, the carrier gas flows into the merge section 32 through an injection pipe 40a. On the other hand, in the interruption state, the carrier gas is exhausted to the outside through a supplemental exhaust pipe 40b.

The automatic valve controller 26 controls opening and closing of both the electromagnetic three-way valve 24 and the electromagnetic three-way valve 40. When the electromagnetic three-way valve 24 is in the feed state, the electromagnetic three-way valve 40 is controlled to be in the interruption state. On the other hand, when the electromagnetic three-way valve 24 is in the interruption state, the electromagnetic three-way valve 40 is controlled to be in the feed state.

The use of an electromagnetic three-way valve enables instantaneous gas feed and instantaneous gas interruption. Therefore, it is controlled that the raw material gas of the predetermined flow quantity q is instantaneously merged into the carrier gas of the basic flow quantity Q, or the carrier gas of the predetermined flow quantity q is instantaneously merged concurrently with interruption of the raw material gas.

Figure 8:
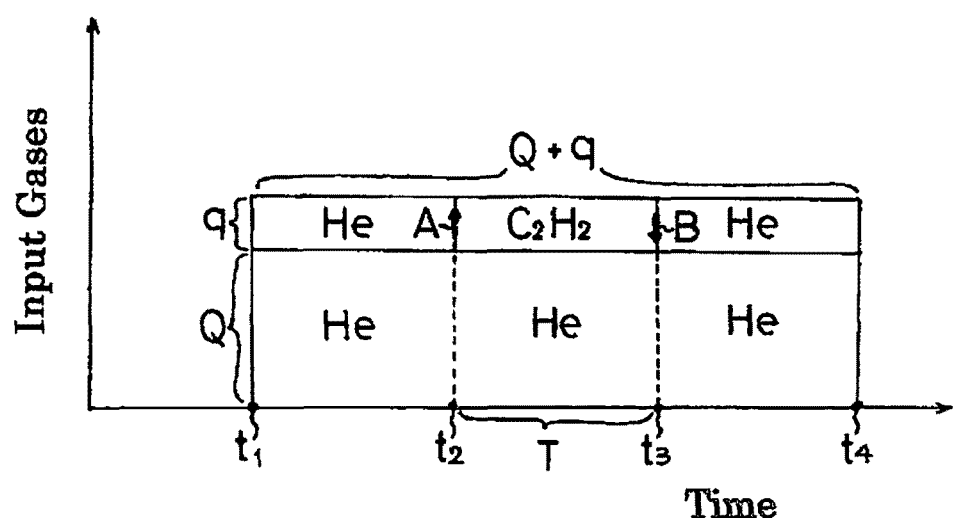
FIG. 8 is a time series graph of flow quantity of gas in the Second Embodiment of the present invention.

FIG. 8 is a time series graph of flow quantity of gas in the Second Embodiment of the present invention. The carrier gas of the basic flow quantity Q is continuously fed during a time between $t_1$ and $t_4$. In a time between $t_1$ and $t_2$, the carrier gas of the predetermined flow quantity q is fed, and a total flow quantity becomes Q+q. In a time between $t_2$ and $t_3$, the raw material gas of the predetermined flow quantity q is fed, and a total flow quantity becomes Q+q. In a time between $t_3$ and $t_4$, the carrier gas of the predetermined flow quantity q is fed, and a total flow quantity becomes Q+q.

Therefore, through the entire process, a total flow quantity of the raw material gas and the carrier gas is controlled to be Q+q all the time. When the total flow quantity is constant, a gas pressure inside the reaction chamber 4 becomes constant. Since the raw material gas is decomposed under a situation where overall pressure (gas pressure) is constant, there occur no pressure fluctuations inside the reaction chamber 4. This realizes steady gas environmental conditions of the catalyst support 8 and promotes the growth of the carbon nanostructure 8.

At time $t_2$, under control of the electromagnetic three-way valve, a rise of the raw material gas (direction indicated by the arrow A) and a fall of the carrier gas are instantaneously and concurrently performed. Therefore, there occurs no instable gas flow. Also, at time $t_3$, under control of the electromagnetic three-way valve, a fall of the raw material gas (direction indicated by the arrow B) and a rise of the carrier gas are instantaneously and concurrently performed. Therefore, there occurs no instable gas flow. Since there occurs no fluctuation and instability of the total gas flow quantity during the raw material gas feed time T, it is possible to promote the growth of carbon nanostructure. Especially, no instability at the feed of the raw material gas (time $t_2$) brings the effect of significantly promoting an initial growth.

Figure 9:
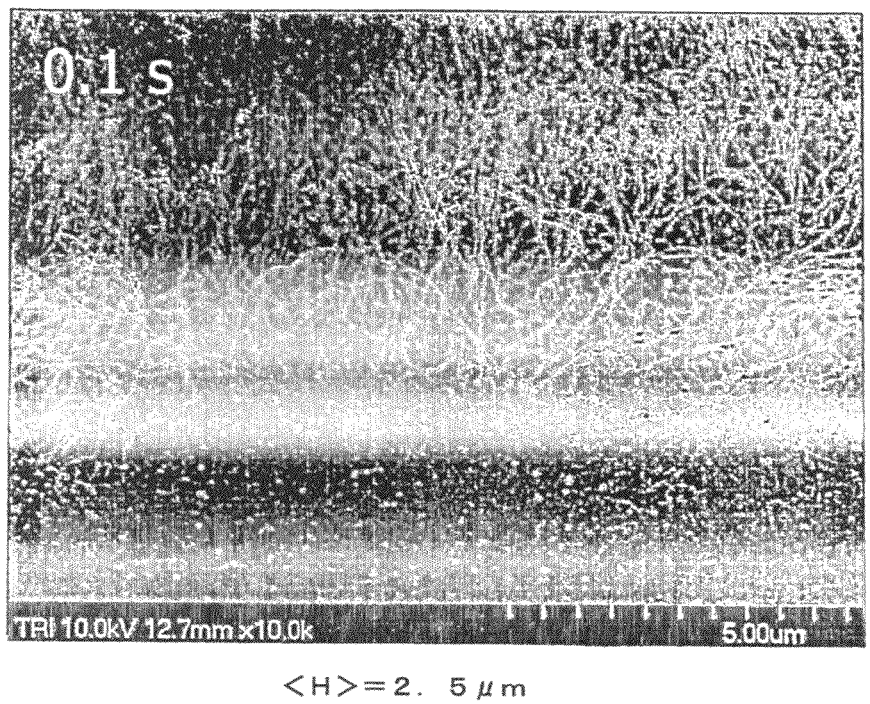
FIG. 9 is a SEM micrograph of a carbon nanotube which was grown in the Second Embodiment of the present invention.

FIG. 9 is a SEM micrograph of a carbon nanotube which was grown in the Second Embodiment of the present invention. Conditions for growth of this carbon nanotube are as follows: A flow quantity Q was 200 sccm, and a flow quantity q was 60 sccm. In the reaction chamber 4, a temperature was controlled to 700° C., and a pressure was maintained to atmospheric pressure ($1 \times 10^5$ Pa). A revolutionary growth promotion effect was found that carbon nanotubes grow to a height H of 2.5 μm on average in a short time, 0.1 seconds elapsed from the start of raw material gas feed.

Figure 10:
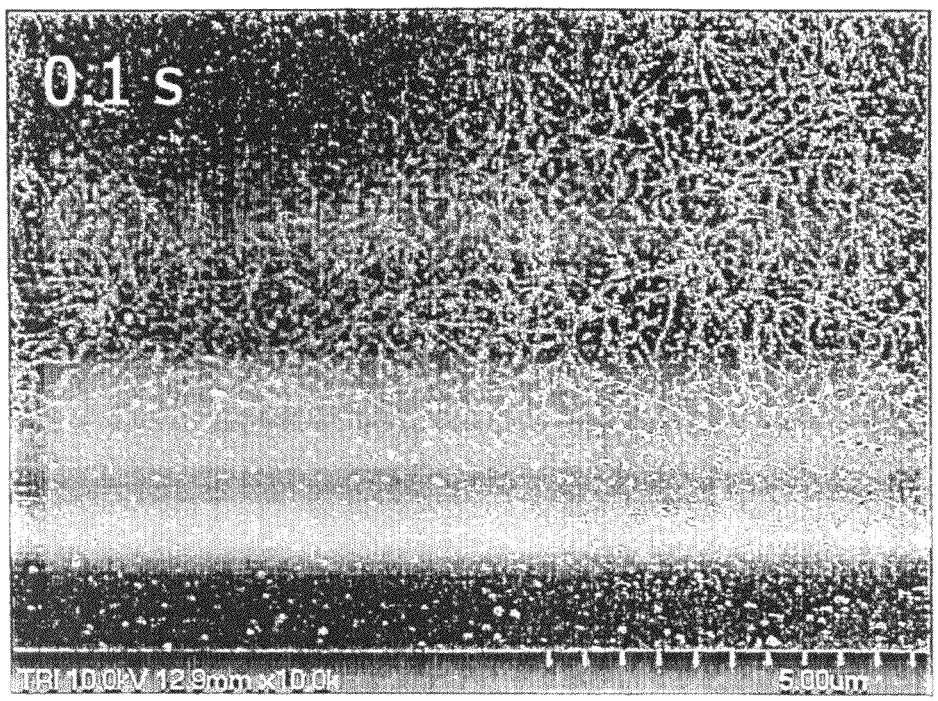
FIG. 10 is a SEM micrograph of a carbon nanotube which was grown in the First Embodiment of the present invention, as a comparative example.

FIG. 10 is a SEM micrograph of a carbon nanotube which was grown in the First Embodiment of the present invention, as a comparative example. Conditions for growth of this carbon nanotube are also as follows: A flow quantity Q of a carrier gas was 200 sccm, and a flow quantity q of a raw material gas was 60 sccm. In the reaction chamber 4, a temperature was controlled to 700° C., and a pressure was maintained to atmospheric pressure ($1 \times 10^5$ Pa). In the First Embodiment, the total flow quantity is not constant. However, the result was obtained that carbon nanotubes grow to a height H of 1.0 μm on average. It can be understood that addition of a constant total flow quantity realizes a 2.5-times speedup of the height growth even in an initial stage of the growth.

Figure 11:
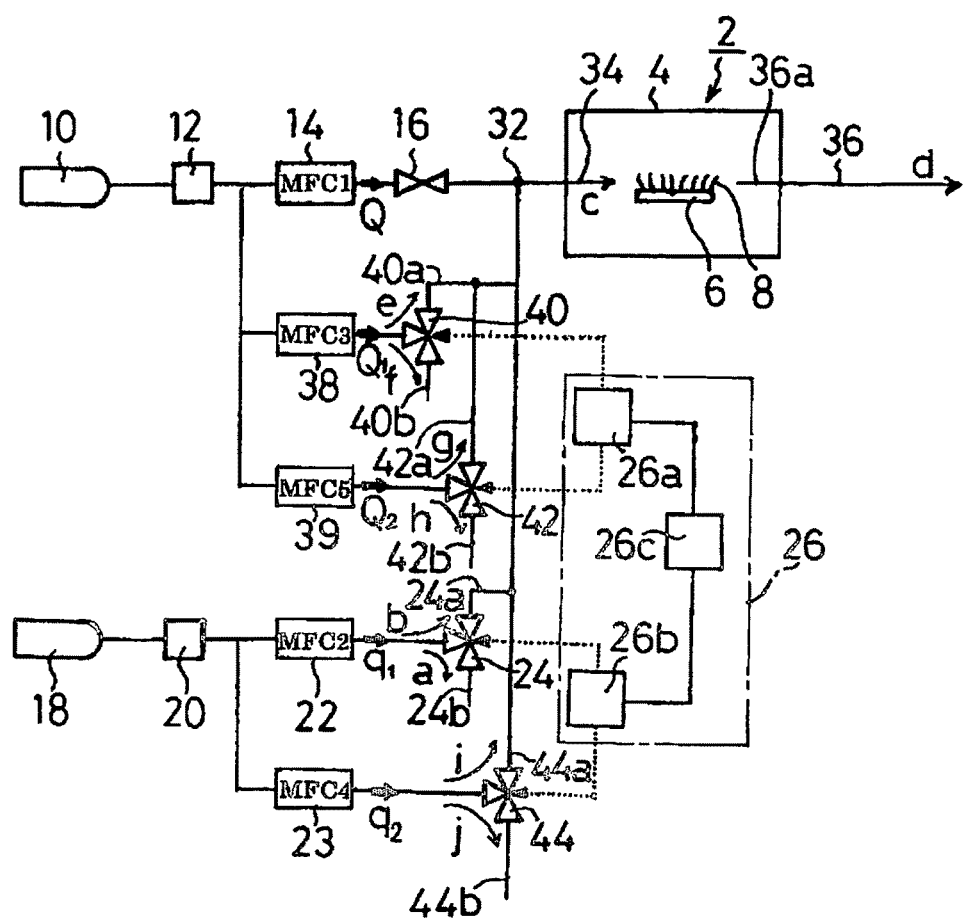
FIG. 11 is a schematic block diagram of a high-efficiency synthesis apparatus of carbon nanostructure in Third Embodiment according to the present invention.

FIG. 11 is a schematic block diagram of a high-efficiency synthesis apparatus of carbon nanostructure in Third Embodiment according to the present invention. In the Third Embodiment, raw material gas is divided into raw material gases of predetermined flow quantities $q_1$ and $q_2$. Corresponding to the number of divisions, carrier gas is also divided into carrier gases of predetermined flow quantities $Q_1$ and $Q_2$, except for carrier gas of the basic flow quantity Q.

A carrier gas flow quantity controller 38 that is a massflow controller MFC3 obtains carrier gas flow quantity $Q_1$. Similarly, a carrier gas flow quantity controller 39 that is a massflow controller MFC5 obtains carrier gas flow quantity $Q_2$. Feed and interruption of these carrier gasses are controlled by electromagnetic three-way valves 40 and 42.

A raw material gas flow quantity controller 22 that is a massflow controller MFC2 obtains raw material gas flow quantity $q_1$. Similarly, a raw material gas flow quantity controller 23 that is a massflow controller MFC4 obtains raw material gas flow quantity $q_2$. Feed and interruption of these raw material gasses are controlled by electromagnetic three-way valves 24 and 44.

When the carrier gas flow quantity $Q_1$ is fed, it flows toward an injection pipe 40$a$ in a direction indicated by an arrow e. When the carrier gas flow quantity $Q_1$ is interrupted, it flows toward a supplemental exhaust pipe 40$b$ in a direction indicated by an arrow f. When the carrier gas flow quantity $Q_2$ is fed, it flows toward an injection pipe 42$a$ in a direction indicated by an arrow g. When the carrier gas flow quantity $Q_2$ is interrupted, it flows toward a supplemental exhaust pipe 42$b$ in a direction indicated by an arrow h.

When the raw material gas flow quantity $q_1$ is fed, it flows toward an injection pipe 24$a$ in a direction indicated by an arrow b. When the raw material gas flow quantity $q_1$ is interrupted, it flows toward a supplemental exhaust pipe 24$b$ in a direction indicated by an arrow a. When the raw material gas flow quantity $q_2$ is fed, it flows toward an injection pipe 44$a$ in a direction indicated by an arrow i. When the raw material gas flow quantity $q_2$ is interrupted, it flows toward a supplemental exhaust pipe 44$b$ in a direction indicated by an arrow j.

The electromagnetic three-way valves 40 and 42 for the carrier gas are controlled their feeding and interruption by the carrier gas valve controller 26$a$, and the electromagnetic three-way valves 24 and 44 for the raw material gas are controlled their feeding and interruption by the raw material gas valve controller 26$b$. Timing adjustment for these valve controllers 26$a$ and 26$b$ is performed by a general gas valve controller 26$c$. The automatic valve controller 26 is composed of the carrier gas valve controller 26$a$, the raw material gas valve controller 26$b$, and the general gas valve controller 26$c$.

Figure 12:
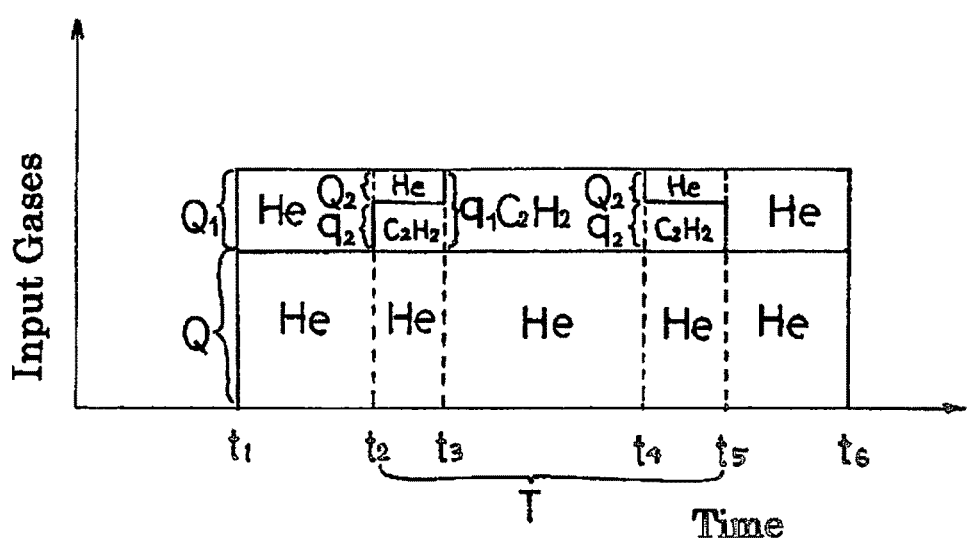
FIG. 12 is a time series graph of flow quantity of gas in the Third Embodiment of the present invention.

FIG. 12 is a time series graph of flow quantity of gas in the Third Embodiment of the present invention. Throughout the time between $t_1$ and $t_6$, carrier gas of the basic flow quantity Q is fed. First, at time $t_1$, only the electromagnetic three-way valve 40 is in a feed state, carrier gas of the flow quantity $Q_1$ is fed, and the electromagnetic three-way valves 42, 24, and 44 are interrupted. Therefore, during the time between $t_1$ and $t_2$, only carrier gas of flow quantity $Q+Q_1$ is fed to the reaction chamber 4.

Next, at time $t_2$, the electromagnetic three-way valves 42 and 44 are in a feed state, carrier gas of flow quantity $Q_2$ and raw material gas of flow quantity $q_2$ are fed, and the electromagnetic three-way valves 40 and 24 are interrupted. Therefore, during the time between $t_2$ and $t_3$, mixed gas of flow quantity $Q+Q_2+q_2$ is fed to the reaction chamber 4. However, because of a setting of $Q_2+q_2=Q_1$, the total flow quantity is controlled constant.

Further, at time $t_3$, only the electromagnetic three-way valve 24 is in a feed state, raw material gas of flow quantity $q_1$ is fed, and the electromagnetic three-way valves 40, 42, and 44 are interrupted. Therefore, during the time between $t_3$ and $t_4$, mixed gas of flow quantity $Q+q_1$ is fed to the reaction chamber 4. However, because of a setting of $q_1=Q_1$, the total flow quantity is controlled constant.

At time $t_4$, the electromagnetic three-way valves 42 and 44 are in a feed state, carrier gas of flow quantity $Q_2$ and raw material gas of flow quantity $q_2$ are fed, the electromagnetic three-way valves 40 and 24 are interrupted. Therefore, during the time between $t_4$ and $t_5$, mixed gas of flow quantity $Q+Q_2+q_2$ is fed to the reaction chamber 4. Similarly, because of a setting of $Q_2+q_2=Q_1$, the total flow quantity is controlled constant.

Finally, at time $t_5$, only the electromagnetic three-way valve 40 is in a feed state, carrier gas of flow quantity $Q_1$ is fed, and the electromagnetic three-way valves 42, 24, and 44 are interrupted. Therefore, during the time between $t_5$ and $t_6$, only carrier gas of flow quantity $Q+Q_1$ is fed to the reaction chamber 4.

As described above, feeding raw material gas in multiple levels requires the corresponding number of electromagnetic three-way valves for feed control of the raw material gas. Similarly, feeding carrier gas in multiple levels requires the corresponding number of electromagnetic three-way valves for feed control of the carrier gas. In addition, it is necessary to properly regulate a flow quantity of the raw material gas and a flow quantity of the carrier gas so that the total flow quantity of raw material gas and carrier gas can be constant all the time.

Such a control in multiple levels also allows for instantaneous feed and interruption of raw material gas and carrier gas. This causes no fluctuations of gas flow and thus promotes the growth of carbon nanostructure. Moreover, since the total flow quantity is controlled to be constant all the time, raw material gas is decomposed stably, which allows the growth of carbon nanostructure to be promoted. Especially, because of instantaneous and stable feed of raw material gas, an initial growth of carbon nanostructure can be promoted.

Figure 13:
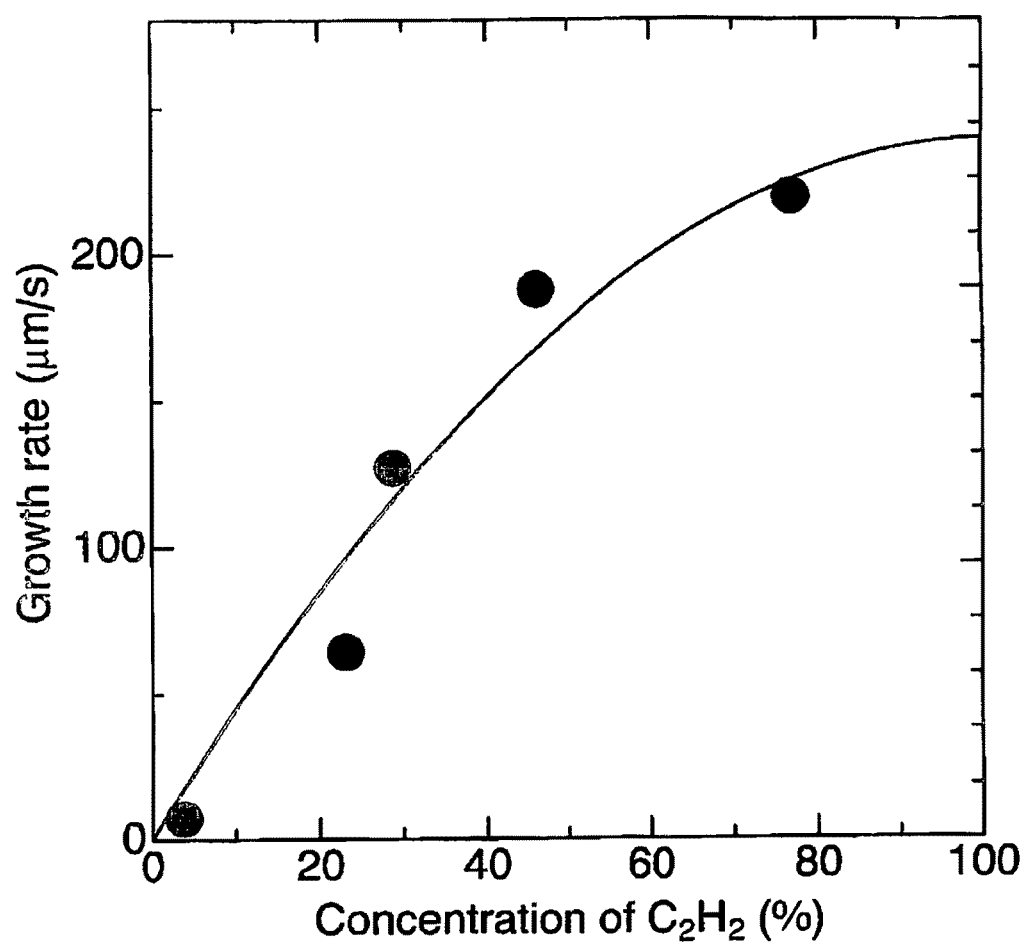
FIG. 13 is a diagram illustrating a relation between acetylene concentration and growth rate of carbon nanotube in the foregoing Embodiments.

FIG. 13 is a diagram illustrating a relation between acetylene concentration and growth rate of carbon nanotube in the foregoing Embodiments. A vertical axis indicates growth rate (μm/s) of carbon nanotube, specifically initial growth rate of carbon nanotube. A horizontal axis indicates acetylene concentration (Concentration of $C_2H_2$). Acetylene concentration is expressed in volume percentage of a total gas volume. When acetylene concentration is low, the growth rate of carbon nanotube tends to increase proportionately. However, when acetylene concentration exceeds 50%, the growth rate of carbon nanotube gradually decreases. This shows that the present invention properly regulate acetylene concentration so as to control the growth rate.

Figure 14:
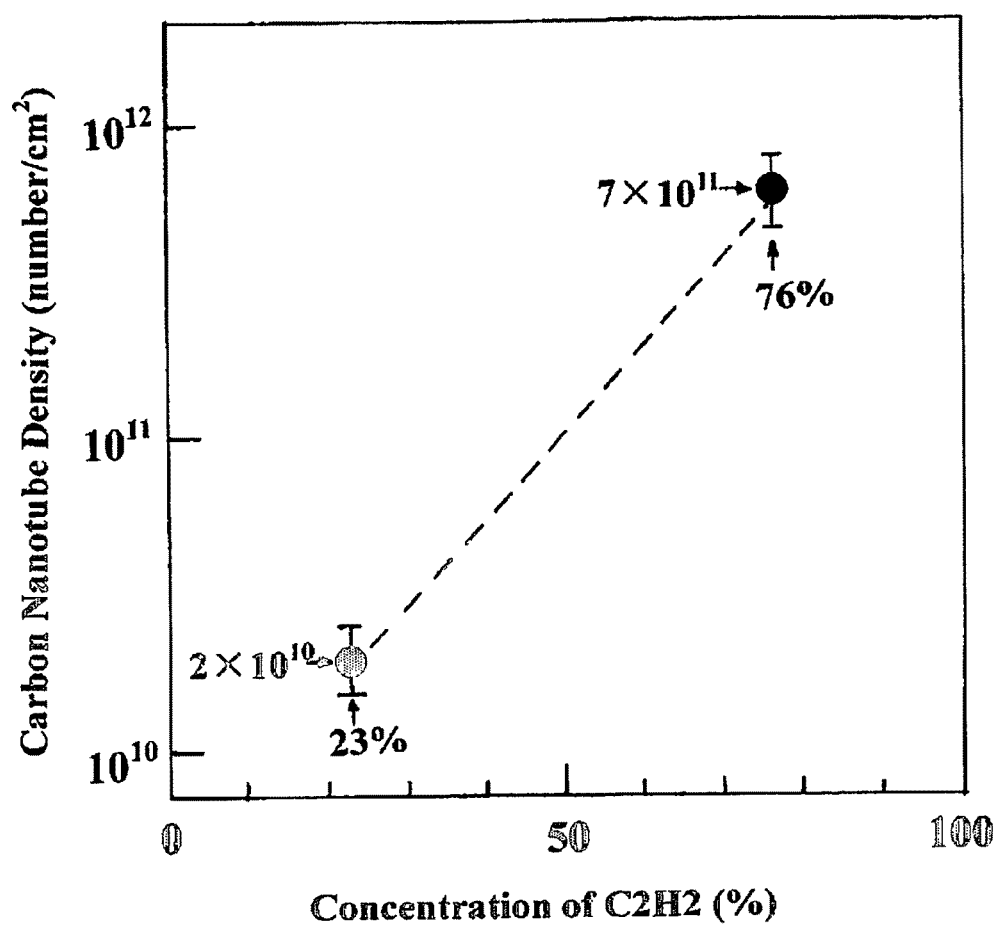
FIG. 14 is a diagram illustrating a relation between acetylene concentration and carbon nanotube density in the foregoing Embodiments.

FIG. 14 is a diagram illustrating a relation between acetylene concentration and carbon nanotube density in the foregoing Embodiments. A vertical axis indicates carbon nanotube density (number/cm$^2$). A horizontal axis indicates acetylene concentration (Concentration of $C_2H_2$). Acetylene concentration is expressed in volume percentage of a total gas volume. Carbon nanotube density tends to increase exponentially with acetylene concentration. When acetylene concentration is 23%, carbon nanotube density is $2\times10^{10}$ (number/cm$^2$). When acetylene concentration is 76%, carbon nanotube density increases to $7\times10^{11}$ (number/cm$^2$). This shows that the present invention can realize a high-density growth of brush-type carbon nanotubes.

Figure 15:
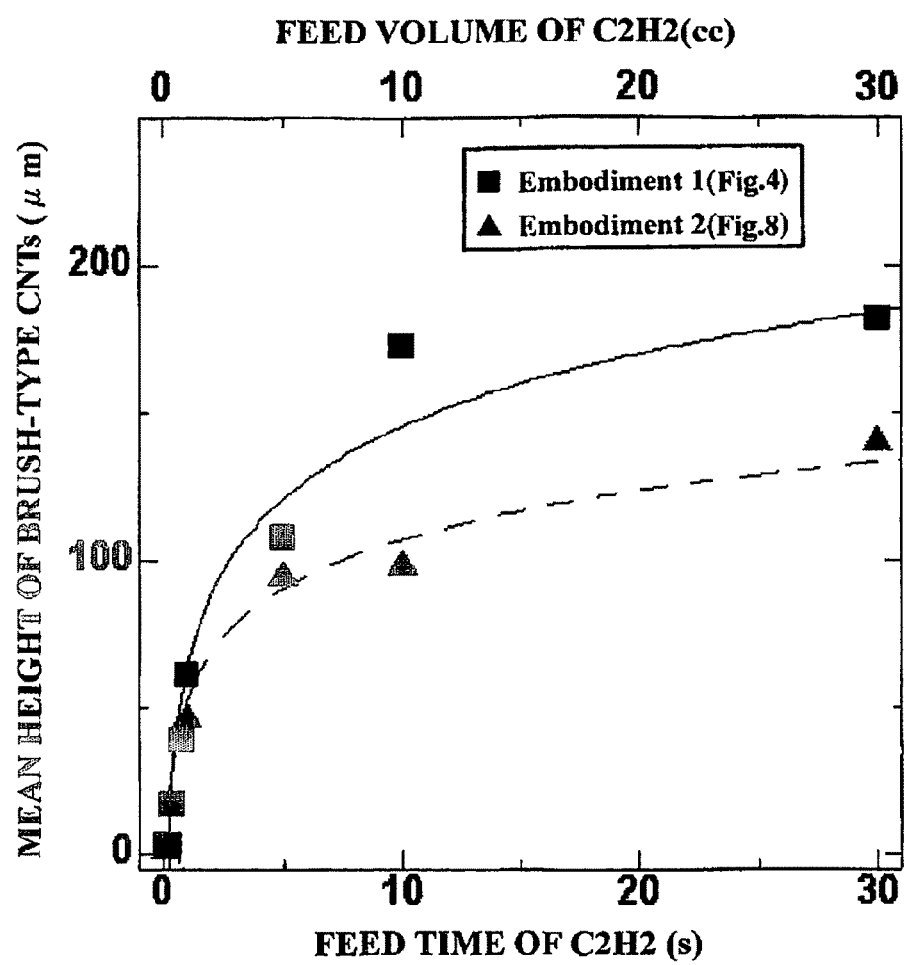
FIG. 15 is a diagram illustrating a relation between mean height of brush-type carbon nanotubes and feed time of acetylene in the foregoing Embodiments.

FIG. 15 is a diagram illustrating a relation between mean height of brush-type carbon nanotubes and feed time of acetylene in the foregoing Embodiments. A vertical axis indicates mean height of brush-type carbon nanotubes (Mean. Height of Brush-Type CNTs: μm). A horizontal axis indicates feed time of acetylene (Feed time of $C_2H_2$: s). In the First Embodiment (FIG. 4) and Second Embodiment (FIG. 8), the mean height tends to be saturated within about 10 seconds. This proves that the brush-type carbon nanotubes grow within about 10 seconds, and proves importance of initial control.

Figure 16:
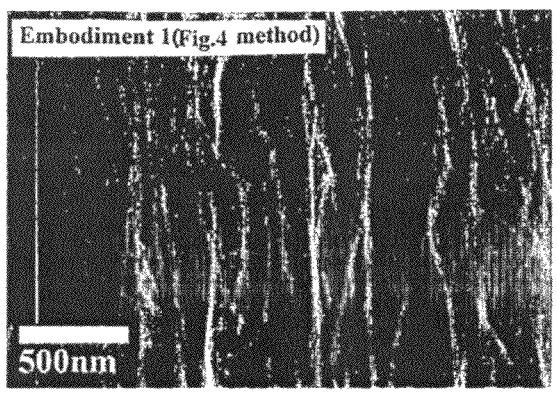
FIG. 16 illustrates photographs of side faces of brush-type carbon nanotubes in the foregoing Embodiments, magnified by an electron microscope.
Figure 16:
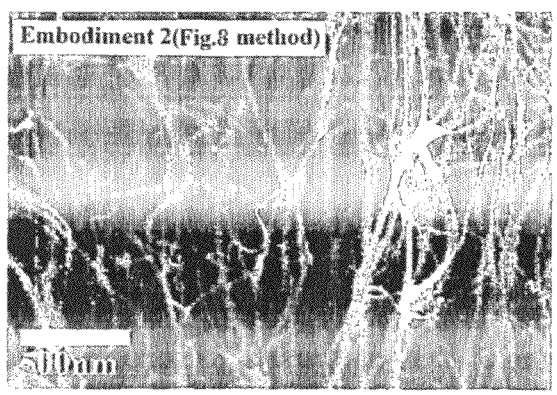
Figure 16:
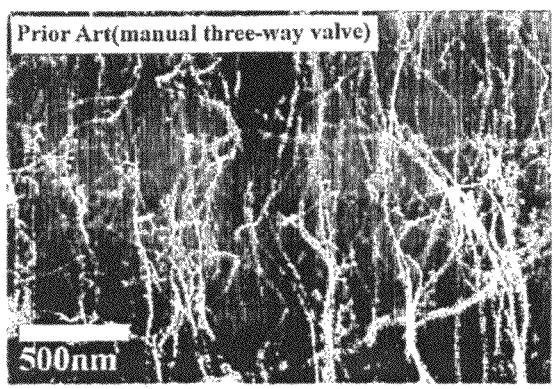

FIG. 16 illustrates photographs of side faces of brush-type carbon nanotubes in the foregoing Embodiments, magnified by an electron microscope. A photograph on the top of FIG. 16 of carbon nanotubes produced in the First Embodiment (FIG. 4) shows that the carbon nanotubes stand nearly straight. A photograph on the middle of FIG. 16 of carbon nanotubes produced in the Second Embodiment (FIG. 8) shows that the carbon nanotubes stand slightly zigzag. A photograph on the bottom of FIG. 16 of carbon nanotubes produced in the conventional art using a manual three-way valve shows that carbon nanotubes stand quite zigzag and shows that straightness of carbon nanotubes is not ensured. From this, it is clear that the present invention performing an initial control can realize brush-type carbon nanotubes having high density and high straightness.

Figure 17:
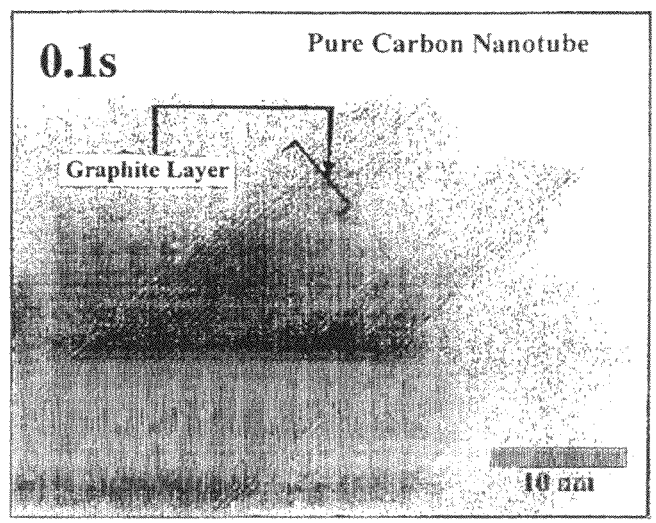
FIG. 17 illustrates photographs of carbon nanotubes in the foregoing Embodiments, taken by a transmission electron microscope.
Figure 17:
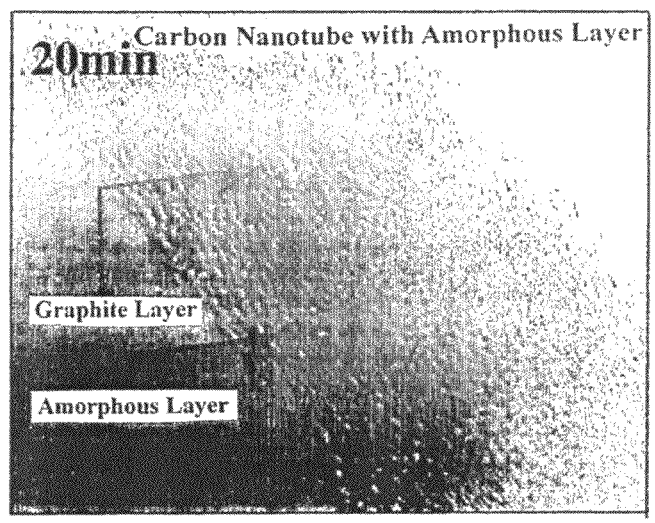
Figure 18:
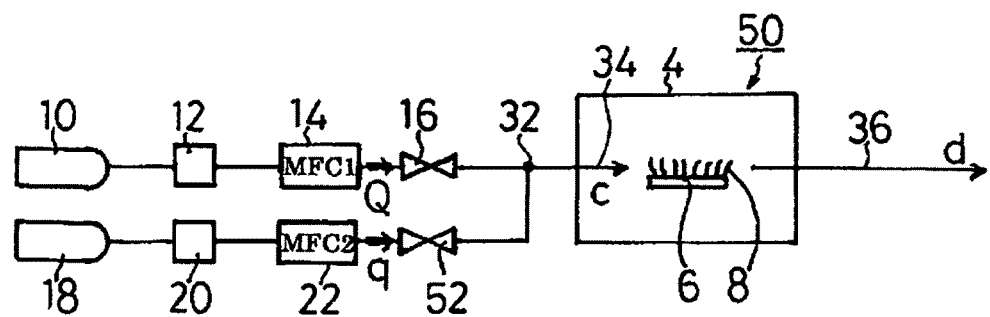
FIG. 18 is a schematic block diagram of the carbon nanostructure synthesis apparatus 50 that is a first conventional art.
Figure 19:
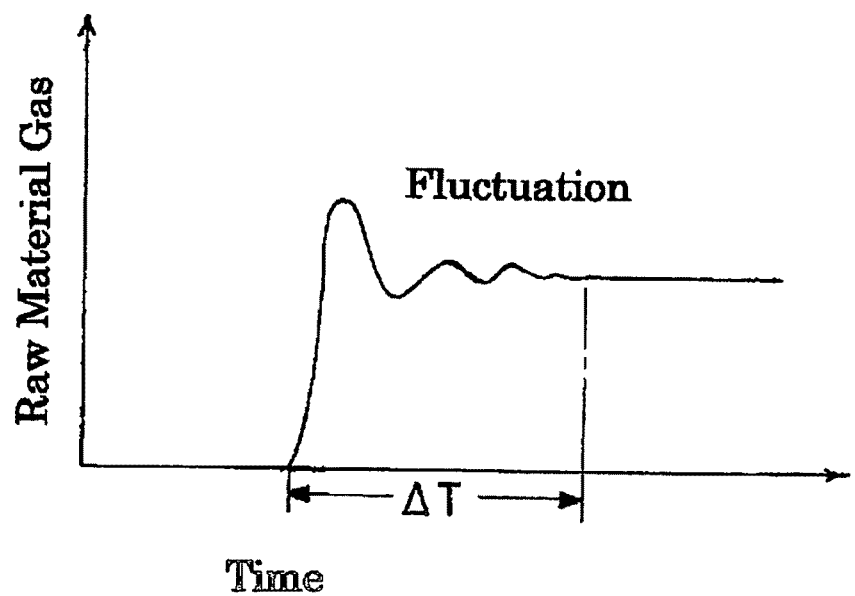
FIG. 19 is a time series graph showing initial instability of flow quantity of raw material gas in a raw material gas flow quantity controller 22 of the conventional apparatus.

FIG. 17 illustrates photographs of carbon nanotubes in the foregoing Embodiments, taken by a transmission electron microscope. A photograph on the top of FIG. 17 taken by a transmission electron microscope shows a carbon nanotube whose growth time is 0.1 seconds and shows a high-purity carbon nanotube composed of only a graphite layer (pure carbon nanotube). It is apparent that this graphite layer is of a laminated structure of graphene sheets. A photograph on the bottom of FIG. 17 taken by a transmission electron microscope shows a carbon nanotube whose growth time is 20 minutes and shows a carbon nanotube composed of a graphite layer and an amorphous layer deposited around the graphite layer (Carbon Nanotube with Amorphous Layer). This proves that a short-time growth using the present invention causes growth of high-purity carbon nanotube, whereas long-time growth causes an amorphous layer to be deposited as an impurity.

The present invention is not to be limited to production of carbon nanotubes, carbon nanocoils, and fullerene. The present invention can be applied to production of a wide range of carbon nanostructures including carbon nanotwists, carbon nanotubes with beads, and carbon nanobrushes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Industrial Applicability

According to the first mode of the present invention, since initiation of the contact between raw material gas and a catalyst is carried out instantaneously under the reaction conditions, there occur no initial fluctuations and no slow rise in concentration (flow quantity) of the raw material gas, and this enables active initial growth of carbon nanostructure. This realizes not only high-efficiency height growth and thickness growth of carbon nanostructure, but also high-density growth and short-period high-speed growth of carbon nanostructure. The foregoing catalyst includes catalysts of any forms, such as catalyst substrate, catalyst structure, catalyst powders, and catalyst pellet.

According to the second mode of the present invention, feed of raw material gas flow to the catalyst placed stationary in a reaction chamber, is controlled at a high speed in a short period under electronic control, computer control, or the like. Therefore, the raw material gas of a predetermined flow quantity (predetermined concentration) comes into contact with the catalyst at a burst, which promotes initial growth of carbon nanostructure. This realizes not only high-efficiency height growth and thickness growth of carbon nanostructure, but also high-density growth and short-period high-speed growth of carbon nanostructure. The arrangement where the catalyst is made stationary is preferable for catalyst substrate and catalyst structure.

According to the third mode of the present invention, the initiation of the contact is carried out instantaneously in such a manner that under a condition where the raw material gas is circulated, the catalyst is caused to move from outside the raw material gas to inside the raw material gas. Instantaneous movement or instantaneous spraying of the catalyst causes an instantaneous initiation of the contact between the catalyst and the raw material gas, and thus promotes initial growth of carbon nanostructure. This realizes not only high-efficiency height growth and thickness growth of carbon nanostructure, but also high-density growth and short-period high-speed growth of carbon nano structure.

According to the fourth mode of the present invention, the initiation of the contact between the catalyst and the raw material gas can be carried out instantaneously in such a manner that under a condition where the raw material gas of a predetermined concentration is filled in the reaction chamber and where the catalyst is placed in an area that is mechanically isolated from the reaction chamber, the catalyst is instantaneously moved to the reaction chamber mechanically. Further, instantaneous spraying the catalyst powders into the reaction chamber enables instantaneous contact between the catalyst and the raw material gas. Such instantaneous movement or instantaneous spraying causes an instantaneous initiation of the contact between the catalyst and the raw material gas and thus promotes initial growth of carbon nanostructure. This realizes not only high-efficiency height growth and thickness growth of carbon nanostructure, but also high-density growth and short-period high-speed growth of carbon nanostructure.

According to the fifth mode of the present invention, an environmental temperature of the catalyst and the raw material gas both of which are in contact with each other, is instantaneously risen to the reaction temperature. This causes instantaneous initiation of the reaction contact between the catalyst and the raw material gas, and thus promotes initial growth of carbon nanostructure. This realizes not only high-efficiency height growth and thickness growth of carbon nanostructure, but also high-density growth and short-period high-speed growth of carbon nanostructure. To realize an instantaneous temperature rise, it is effective that the catalyst is subjected to beam irradiation such as laser beam irradiation, infrared beam irradiation, electron beam irradiation, or ion beam irradiation. However, any other known heating methods can be applied.

According to the sixth mode of the present invention, stopping of the contact between the raw material gas and the catalyst is carried out instantaneously. This is effective particularly for the production of carbon nanostructure in a short-period growth.

According to the seventh mode of the present invention, a flow quantity of the raw material gas to be fed is instantaneously risen to a predetermined flow quantity so that the raw material gas is fed to the reaction chamber. Therefore, there occur no initial fluctuations and no slow rise of the raw material gas flow quantity at the feed of the raw material gas, and this enables active initial growth of carbon nanostructure. This realizes not only high-efficiency height growth and thickness growth of carbon nanostructure, but also high-density growth and short-period high-speed growth of carbon nanostructure.

According to the eighth mode of the present invention, the raw material gas is interrupted with only the carrier gas circulated, and the raw material gas is fed with the carrier gas decreased by feed volume of the raw material gas. Therefore, a total gas flow quantity of the carrier gas and the material gas is maintained constant all the time during interruption of the raw material gas and during feed of the raw material gas. Thus, a constantly maintained flow quantity of gas on the surface of the catalyst before and after the initiation of raw material gas feed can accelerate initial growth of carbon nanostructure after feed of the raw material gas. This enables mass synthesis of carbon nanostructures. Especially, in a short-time growth of carbon nanostructures, constancy in gas flow quantity (flow quantity of carrier gas+flow quantity of raw material gas) is an extremely important element.

According to the ninth mode of the present invention, since a flow quantity of the raw material gas is controlled to be changed in a plurality levels while a total flow quantity of the carrier gas and the raw material gas is maintained constant all the time, it is possible to freely increase the growth rate of carbon nanostructure. For example, under a condition where the total flow quantity is set to Q, in order to change a feed flow quantity of the raw material gas in two flow quantity levels $q_1$ and $q_2$, it is necessary to change a feed flow quantity of the carrier gas into two flow quantity levels $Q-q_1$ and $Q-q_2$. Naturally, when no raw material gas is fed, a flow quantity of the carrier gas is set to Q. In this manner, when a feed flow quantity of the raw material gas is controlled in a plurality of levels, the total flow quantity is also controlled to be constant all the time. This makes it possible to efficiently synthesize carbon nanostructures even when a flow quantity of the raw material gas is changed.

According to the tenth mode of the present invention, since the raw material gas which is controlled to be of a predetermined quantity is exhausted during interruption of the raw material gas, and the raw material gas is instantaneously fed to the reaction chamber by using the electromagnetic three-way valve at the time of feeding the raw material gas, feed and interruption of the raw material gas can be instantaneously carried out by electromagnetic force. Therefore, the raw material gas can be fed with its flow quantity instantaneously risen to a predetermined flow quantity, which eliminates variations in flow quantity at the initial feed of the raw material gas. As a result of this, initial growth of carbon nanostructure is promoted. The promotion brings the effect of promoting middle-stage growth of carbon nanostructure. Thus, it is possible to mass-produce carbon nanostructures at a high speed.

According to the eleventh mode of the present invention, not only the raw material gas of a predetermined flow quantity can be fed instantaneously, but also the total flow quantity before and after feed of the raw material gas can be maintained constant. This ensures constancy in gas flow quantity and constancy in gas pressure on the surface of the catalyst, and thus brings the effect of promoting initial growth of carbon nanostructure at the time of initial feed of the raw material gas. For example, in order to grow carbon nanostructure with a low density on the catalyst substrate, a raw material gas feed time must be short. In view of this, the present invention is highly effective because the present invention strongly promotes initial growth of the raw material gas.

According to the twelfth mode of the present invention, even when feed flow quantity levels of the raw material gas are changed in two or more levels, the total flow quantity can be maintained constant all the time. Therefore, realization of both instantaneous feed initiation of the raw material gas and a constant total flow quantity brings an active initial growth of carbon nanostructure. Thus, it is possible to provide a high-density and high-efficiency synthesis apparatus of carbon nanostructure.

According to the thirteenth mode of the present invention, since initiation and stopping of the reaction between the catalyst and the raw material gas can be carried out instantaneously, high-purity carbon nanostructures of various kinds can be synthesized with high efficiency. Examples of the carbon nanostructure include carbon nanotubes, carbon nanotubes with beads, brush-type carbon nanotubes that are a forest of carbon nanotubes, carbon nanotwists that are carbon nanotubes having twists, carbon nanocoils in coil form, and fullerenes in spherical shell form.

According to the fourteenth mode of the present invention, the contact with the raw material gas can be initiated and stopped instantaneously. This enables a short-period growth control, thus realizing to produce high-purity carbon nanotubes that has no amorphous layer or that hardly has amorphous layer.

According to the fifteenth mode of the present invention, a time of the contact between the catalyst and the raw material gas can be controlled to a desired time, especially a time within 100 seconds. This enables high-purity carbon nanotubes to be grown in brush forms with high density. This is realized by arbitrary time within 100 seconds. However, 0.01-60 seconds realizes carbon nanotubes containing almost no impurities.

According to the sixteenth mode of the present invention, carbon nanotubes grow with high density. In many cases, this is realized in such a manner that carbon nanotubes grow in contact with one another and bind to one another on their surfaces by intermolecular force. As a result of this, when the brush-type carbon nanotube is cleaved in arbitrary cross section, there appear thread-type carbon nanotubes on the cross section caused by their attractive forces. The appearance of the thread-type carbon nanotubes proves high density growth. Accordingly, the appearance of the thread-type carbon nanotubes proves that the method of the present invention realizes production of carbon nanotubes.

What is claimed is:

1. A high-efficiency synthesis apparatus of a carbon nanostructure, which is configured to produce a carbon nanostructure using a catalysis by feeding a carrier gas and a raw material gas to a reaction chamber, the apparatus comprising:

a two-way valve configured to feed, to the reaction chamber, the carrier gas which is controlled to be of a selected flow quantity;

a high-speed three-way valve which instantaneously feeds or interrupts the raw material gas which is controlled to be of a selected flow quantity, with respect to the reaction chamber, the high-speed three-way valve being openable and closeable within a time shorter than 0.1 seconds; and a merge section downstream of the high-speed three-way valve and the two-way valve, the merge section being configured to introduce the raw material gas fed from the high-speed three-way valve to the carrier gas fed from the two-way valve, wherein, a source of catalyst is in the reaction chamber, a controller configured to control, at the time of interrupting the raw material gas, the high-speed three-way valve to be instantaneously switched to exhaust position so that feed of the raw material gas is interrupted, and at the time of feeding the raw material gas, the high-speed three-way valve to be instantaneously switched to feed position so that the raw material gas of the selected flow quantity is fed to the reaction chamber, and the carbon nanostructure is selected from the group consisting of a carbon nanotube, a carbon nanotube with beads, a brush-type carbon nanotube, a carbon nanotwist, a carbon nanocoil, and a fullerene in spherical shell form.

2. A high-efficiency synthesis apparatus of a carbon nanostructure, which is configured to produce a carbon nanostructure using a catalysis by feeding a carrier gas and a raw material gas to a reaction chamber, the apparatus comprising:
a two-way valve configured to feed, to the reaction chamber, the carrier gas which is controlled to be of a selected flow quantity;
a first high-speed three-way valve which instantaneously feeds or interrupts the raw material gas which is controlled to be of a selected flow quantity, with respect to the reaction chamber, the first high-speed three-way valve being openable and closeable within a time shorter than 0.1 seconds;
a second high-speed three-way valve which instantaneously feeds or interrupts the carrier gas whose flow quantity is controlled to be the same as the selected flow quantity of the raw material gas, with respect to the reaction chamber, the second high-speed three-way valve being openable and closeable within a time shorter than 0.1 seconds; and
a merge section downstream of the first and second high-speed three-way valves and the two-way valve, the merge section being configured to introduce the raw material gas fed from the first high-speed three-way valve to the carrier gas fed from the two-way valve and the second high-speed three-way valve,
wherein, a source of catalyst is in the reaction chamber,
a controller configured to control, a total flow quantity of the carrier gas and the raw material gas, which is fed to the reaction chamber including the carrier gas of the selected flow quantity, to be constant in such a manner that at the time of feeding the raw material gas with the first high-speed three-way valve, the carrier gas is interrupted with the second high-speed three-way valve, and at the time of interrupting the raw material gas with the first high-speed three-way valve, the carrier gas is fed with the second high-speed three-way valve, and
the carbon nanostructure is selected from the group consisting of a carbon nanotube, a carbon nanotube with beads, a brush-type carbon nanotube, a carbon nanotwist, a carbon nanocoil, and a fullerene in spherical shell form.

3. A high-efficiency synthesis apparatus of a carbon nanostructure, which is configured to produce a carbon nanostructure using a catalysis by feeding a carrier gas and a raw material gas to a reaction chamber, the apparatus comprising:
a two-way valve configured to feed, to the reaction chamber, the carrier gas which is controlled to be of a selected flow quantity;
a plurality of first high-speed three-way valves, provided in parallel with each other, which instantaneously feed or interrupt the raw material gas at respective feed flow quantity levels, so that feed flow quantity levels of the raw material gas are changed in a plurality of levels, each of the plurality of first high-speed three-way valves being openable and closeable within a time shorter than 0.1 seconds;

a plurality of second high-speed three-way valves, provided in parallel with each other, which instantaneously feed or interrupt the carrier gas at respective feed flow quantity levels with respect to the reaction chamber, so that feed flow quantity levels of the carrier gas are changed in a plurality of levels that are numerically equal to the feed flow quantity levels of the raw material gas, each of the plurality of second high-speed three-way valves being openable and closeable within a time shorter than 0.1 seconds; and
a merge section downstream of the first and second high-speed three-way valves and the two-way valve, the merge section being configured to introduce the raw material gas fed from the plurality of first high-speed three-way valves to the carrier gas fed from the two-way valve and the plurality of second high-speed three-way valves,
wherein, a source of catalyst is in the reaction chamber,
a controller configured to control a total flow quantity of the carrier gas and the raw material gas, which is fed to the reaction chamber including the carrier gas of the selected flow quantity, to be constant in such a manner that at the time of gas feed, at least one necessary high-speed three-way valve among the first high-speed three-way valves and the second high-speed three-way valves is switched to gas feed position, and
the carbon nanostructure is selected from the group consisting of a carbon nanotube, a carbon nanotube with beads, a brush-type carbon nanotube, a carbon nanotwist, a carbon nanocoil, and a fullerene in spherical shell form.

4. The high-efficiency synthesis apparatus as set forth in claim 1, wherein pressure and temperature in the reaction chamber are controllable to be constant.

5. The high-efficiency synthesis apparatus as set forth in claim 2, wherein pressure and temperature in the reaction chamber are controllable to be constant.

6. The high-efficiency synthesis apparatus as set forth in claim 3, wherein pressure and temperature in the reaction chamber are controllable to be constant.

7. The high-efficiency synthesis apparatus as set forth in claim 1, wherein a time of a contact between the catalyst and the raw material gas is controllable to be a desired time within 100 seconds.

8. The high-efficiency synthesis apparatus as set forth in claim 2, wherein a time of a contact between the catalyst and the raw material gas is controllable to be a desired time within 100 seconds.

9. The high-efficiency synthesis apparatus as set forth in claim 3, wherein a time of a contact between the catalyst and the raw material gas is controllable to be a desired time within 100 seconds.

10. The high-efficiency synthesis apparatus as set forth in claim 8, wherein the time of a contact between the catalyst and the raw material gas is controllable to be 0.01-60 seconds.

11. The high-efficiency synthesis apparatus as set forth in claim 9, wherein the time of a contact between the catalyst and the raw material gas is controllable to be 0.01-60 seconds.

12. The high-efficiency synthesis apparatus as set forth in claim 7, wherein the time of a contact between the catalyst and the raw material gas is controllable to be 0.01-60 seconds.

\* \* \* \* \*